United States Patent
Kesavareddigari et al.

(10) Patent No.: US 12,402,007 B2
(45) Date of Patent: Aug. 26, 2025

(54) MITIGATING THE EFFECTS OF ROGUE ACTORS IN VEHICLE-TO-VEHICLE PERCEPTIVE WIRELESS COMMUNICATIONS

(71) Applicant: QUALCOMM Incorporated, San Diego, CA (US)

(72) Inventors: Himaja Kesavareddigari, Bridgewater, NJ (US); Qing Li, Princeton Junction, NJ (US); Kapil Gulati, Belle Mead, NJ (US); Hong Cheng, Basking Ridge, NJ (US); Kyle Chi Guan, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 18/145,005

(22) Filed: Dec. 21, 2022

(65) Prior Publication Data

US 2024/0214814 A1    Jun. 27, 2024

(51) Int. Cl.
H04L 29/06       (2006.01)
H04W 12/122    (2021.01)
H04W 12/63      (2021.01)

(52) U.S. Cl.
CPC ......... *H04W 12/122* (2021.01); *H04W 12/63* (2021.01)

(58) Field of Classification Search
CPC ... H04W 12/122; H04W 12/63; H04W 4/021; H04W 12/12; H04W 4/38; H04W 4/46; H04W 4/44; G08G 1/0129
See application file for complete search history.

(56) References Cited

U.S. PATENT DOCUMENTS

2018/0322785 A1    11/2018   Jerichow et al.
2020/0137580 A1*   4/2020    Yang ................. H04W 12/122
(Continued)

FOREIGN PATENT DOCUMENTS

WO    2018211303 A1    11/2018
WO    2019220162 A1    11/2019

OTHER PUBLICATIONS

International Search Report and Written Opinion—PCT/US2023/083002—ISA/EPO—Mar. 18, 2024.
(Continued)

*Primary Examiner* — William A Corum, Jr.
(74) *Attorney, Agent, or Firm* — Procopio, Cory, Hargreaves & Savitch LLP/QUALCOMM Incorporated

(57) ABSTRACT

The apparatus may be a first wireless device configured to receive a first indication that a second wireless device associated with the first wireless device and a network device is classified as providing data of a first type. The apparatus may further be configured to receive a first set of data elements from the second wireless device. The apparatus may be configured to identify, based on the first set of data elements and a second set of data elements available at the first wireless device, that the classification of the second wireless device may be inaccurate and transmit, based on the identification that the classification of the second wireless device may be inaccurate, at least one of a second indication for the second wireless device to transmit a re-evaluation request or a third indication to the second wireless device to terminate a communication session with the first wireless device.

30 Claims, 16 Drawing Sheets

(56) References Cited

U.S. PATENT DOCUMENTS

| | | | |
|---|---|---|---|
| 2020/0139980 A1* | 5/2020 | Liu | B60W 30/12 |
| 2020/0258320 A1* | 8/2020 | Lu | H04W 4/40 |
| 2020/0280842 A1 | 9/2020 | Liu et al. | |
| 2021/0067967 A1* | 3/2021 | Arzelier | H04L 63/0823 |
| 2022/0232383 A1 | 7/2022 | Monteuuis et al. | |
| 2023/0408642 A1* | 12/2023 | Monteuuis | G01S 7/40 |
| 2024/0214797 A1 | 6/2024 | Kesavareddigari et al. | |
| 2024/0214812 A1 | 6/2024 | Kesavareddigari et al. | |

OTHER PUBLICATIONS

Grover J., et al., "Machine Learning Approach for Multiple Misbehavior Detection in VANET", Communications in Computer and Information Science, Jul. 2011, 11 pages.

Liu Y., et al., "An Access Control Mechanism Based on Risk Prediction for the IoV", 2020 IEEE 91st Vehicular Technology Conference (VTC2020-Spring), IEEE, May 25-28, 2020, 5 Pages.

Liu Y., et al., "An Intelligent Edge-Chain-Enabled Access Control Mechanism for IoV", IEEE Internet of Things Journal, vol. 8, No. 15, Aug. 1, 2021, pp. 12231-12241.

Raya M., et al., "Eviction of Misbehaving and Faulty Nodes in Vehicular Networks", IEEE Journal on Selected Areas in Communications, vol. 25, No. 8, Oct. 2007, pp. 1557-1568.

Weng J-S., et al., "BENBI: Scalable and Dynamic Access Control on the Northbound Interface of SDN-Based Vanet", IEEE Transactions on Vehicular Technology, vol. 68, No. 1, Jan. 2019, pp. 822-831.

\* cited by examiner

MITIGATING THE EFFECTS OF ROGUE ACTORS IN VEHICLE-TO-VEHICLE PERCEPTIVE WIRELESS COMMUNICATIONS

INTRODUCTION

The present disclosure relates generally to communication systems, and more particularly, to perceptive wireless communications. More specifically, the present disclosure relates to wireless devices associated with perceptive wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device (or component thereof) configured to receive, from a network device, a first indication that a second wireless device associated with the first wireless device and the network device is classified as providing data of a first type. The apparatus may further be configured to receive a first set of data elements from the second wireless device. The apparatus may also be configured to identify, based on the first set of data elements received from the second wireless device and a second set of data elements available at the first wireless device, that the classification of the second wireless device may be inaccurate. The apparatus may further be configured to transmit, based on the identification that the classification of the second wireless device may be inaccurate, at least one of a second indication for the second wireless device to transmit a re-evaluation request or a third indication to the second wireless device to terminate a communication session with the first wireless device.

In an aspect of the disclosure, a method, a computer-readable medium, and an apparatus are provided. The apparatus may be a network device (or component thereof) configured to transmit, for a first wireless device, a first indication that a second wireless device associated with the first wireless device and the network device is classified as providing data of a first type. The apparatus may also be configured to receive, for the second wireless device and based on a second set of data elements available at the first wireless device, a re-evaluation request to re-evaluate the classification of the second wireless device.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
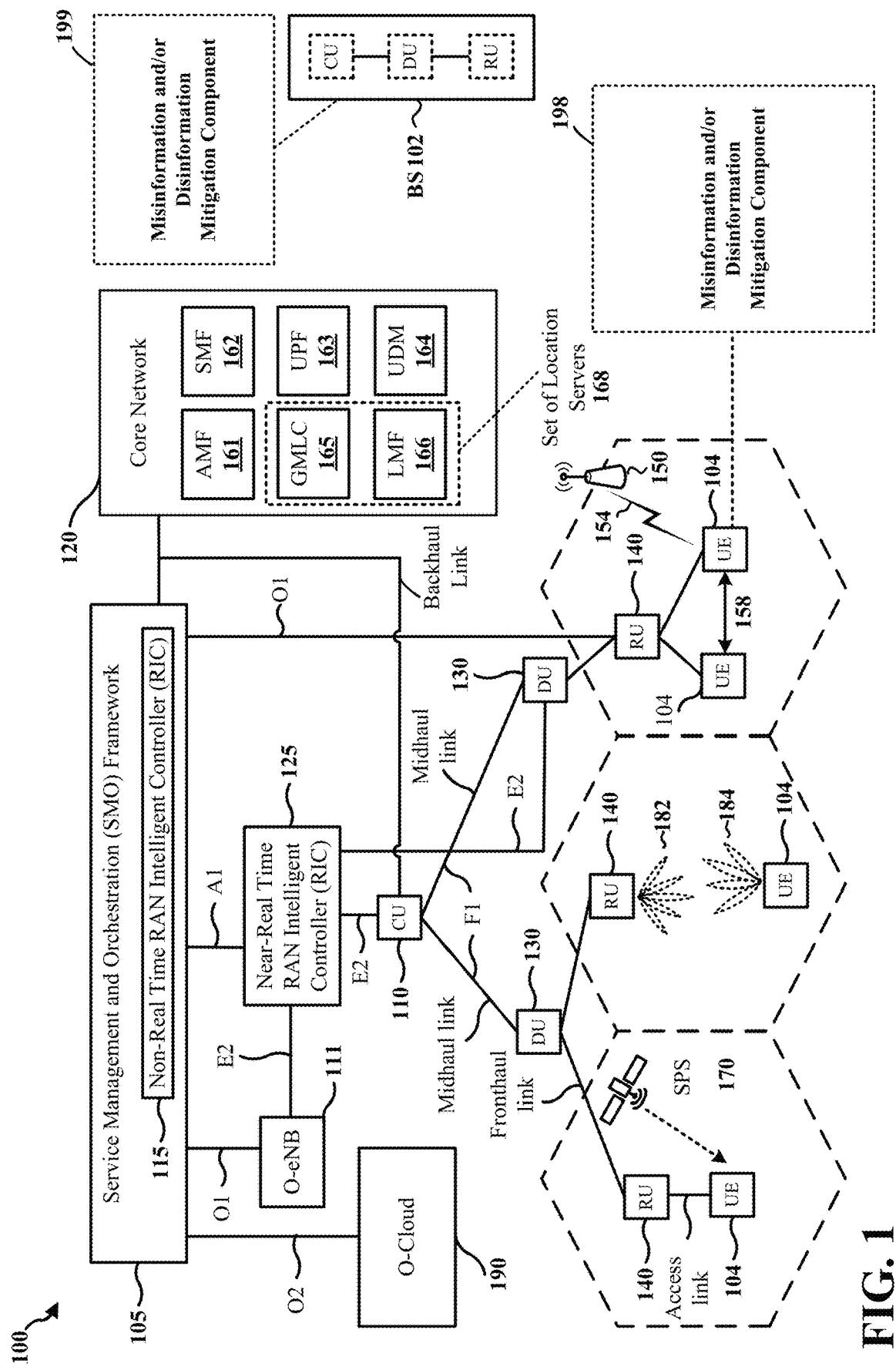
FIG. 1 is a diagram illustrating an example of a wireless communications system and an access network.

In some aspects of wireless communication, a communication network may include perceptive wireless communication components. Aspects presented herein enable a classification of actors within a perceptive wireless communication system in order to improve the management of data collection and usage from different actors within the perceptive wireless communication system. There may be various classifications, e.g., indicating whether an actor provides accurate/reliable data or inaccurate/unreliable data. In other aspects, the classification may indicate whether the inaccurate/unreliable data is unintentional, e.g., non-malicious due to a sensor error, or intentional from a malicious actor. The identification and classification of actors sending inaccurate data enables conditions for the communication sessions with such actors to be terminated or enables conditions for the usage of data from such actors to be changed, which improves the accuracy of the perceptive wireless communication system.

Perceptive wireless communication may relate to communication systems that are assisted by the perception of the physical environment/world. The perception of the physical environment/world, in some aspects, may include, e.g., measurement data and machine learning feature data gathered from vehicular (or other device) sensors, such as radio assisted detection and ranging (RADAR), light detection and ranging (LIDAR), cameras, Global Navigation Satellite System (GNSS), inertial measurement unit (IMU) sensors. Communications tasks that benefit from perception, in some aspects, include beam management, beam blockage prediction, beam refinement, etc.

Perceptive wireless communication (e.g., associated with a wireless communication system providing a wireless communication service), in some aspects, may be associated with vehicle-to-vehicle (V2V) communication. In some aspects, the V2V communication may be associated with, e.g., basic safety messages (BSMs), advanced driver-assistance systems (ADASs) and maneuvering messages, platooning (e.g., vehicle-to-platoon-lead) communication, and/or relaying messages to or from other vUEs. A vehicle (e.g., a vUE), in some aspects may use information from nearby vehicles and/or devices (either directly or indirectly, such as through a base station) to improve the safety or other function associated with the vehicle. The vehicle may, in some aspects, determine whether to use/rely on, or dismiss/ignore, information received from a vehicle and/or device based on a classification of the vehicle as providing a certain type of information and/or data (e.g., intentionally misleading/incorrect information, unintentionally misleading/incorrect information, accurate information, etc.). A particular device (as one example, a particular vehicle) may be classified by multiple elements of the perceptive wireless communication system. The multiple classifications may be inconsistent based on different information being available to the different elements. Using the most relevant classification for the device (e.g., a most relevant classification of the multiple inconsistent classifications) may improve the output of an analysis of received data (e.g., data elements including information regarding location, captured images, radar point clouds, bounding boxes of nearby objects, upcoming maneuvers, etc.). For example, the most relevant classification may be used by each of the multiple elements to determine whether to rely on, or dismiss/ignore data from the device. In some aspects, the output of the analysis of the received data may, for example, relate to safety maneuvers, accident avoidance, communication, or other vehicle functions. For an analysis related to one of a safety maneuver or accident avoidance, for example, using a different, less relevant classification for a device that leads an element in the perception network to ignore accurate information or use misleading/incorrect information may lead to an accident. Accordingly, a method and apparatus are presented to obtain and utilize a classification at a local level (e.g., for a particular UE or local network of UEs, UEs, and/or base stations). In some examples, the particular UE may be a vUE, or the local network of UEs may be a local network of vUEs. The method includes communications exchanged between a UE (e.g., a vUE) and one or more of another UEs, or network entity such as a base station to improve the accuracy of device classifications used to determine whether to use/rely on, or to dismiss/ignore, information received from the device.

In order to maintain the accuracy of such a classification, aspects are presented herein to trigger a reevaluation of a classification of a device. For example, a first device may receive an indication (e.g., a classification) that a second device is classified as provide a first type of data. As one example, the first type may correspond to accurate or reliable information. The first device may then receive a set of data elements from the second device, and may identify that the set of data elements is not consistent with the received classification. As an example, the first device may identify that the first set of data elements does not appear to be accurate or correct. The first device may then transmit a re-evaluation request to request a re-evaluation of the classification of the first device. Additionally, or alternatively, the first device may terminate a communication session with the second device. The request for re-evaluation may help to maintain accurate classifications for devices in the perceptive wireless communication system. The accurate classification across the perceptive wireless communication system enables inaccurate information to be identified and for its usage to be modified, and improves communication within the perceptive wireless communication system. For example, discarding inaccurate information can improve safety maneuvers, accident avoidance, communication, or other vehicle functions in a perceptive wireless communication system.

The detailed description set forth below in connection with the drawings describes various configurations, and the concepts described herein may be practiced in additional configurations. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods.

These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, AI/ML workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a misinformation and/or disinformation mitigation (M/D-M) component 198 that may be configured to receive, from a network device, an indication that a second wireless device in an area associated with the network device is classified as providing one of correct information or incorrect information. The M/D-M component 198 may further be configured to receive one or more data elements from the second wireless device and identify, based on the one or more data elements and information available at the first wireless device, that the classification of the second wireless device indicated by the network device may be inaccurate. The M/D-M component 198 may also be configured to transmit, based on the identification, a re-evaluation request to the network device for the network device to re-evaluate whether to modify the classification of the second wireless device. In certain aspects, the base station 102 may have a M/D-M component 199 that may be configured to transmit, for a first wireless device, a first indication that a second wireless device associated with the first wireless device and the network device is classified as providing data of a first type. The M/D-M component 199 may further be configured to receive, for the second wireless device and based on a second set of data elements available at the first wireless device, a re-evaluation request to re-evaluate the classification of the second wireless device. The M/D-M components 198 and 199 may be configured to manage rogue actor detection, tracking, and handling to improve information based on information shared between devices.

Figures 2A, 2B, 2C, 2D:
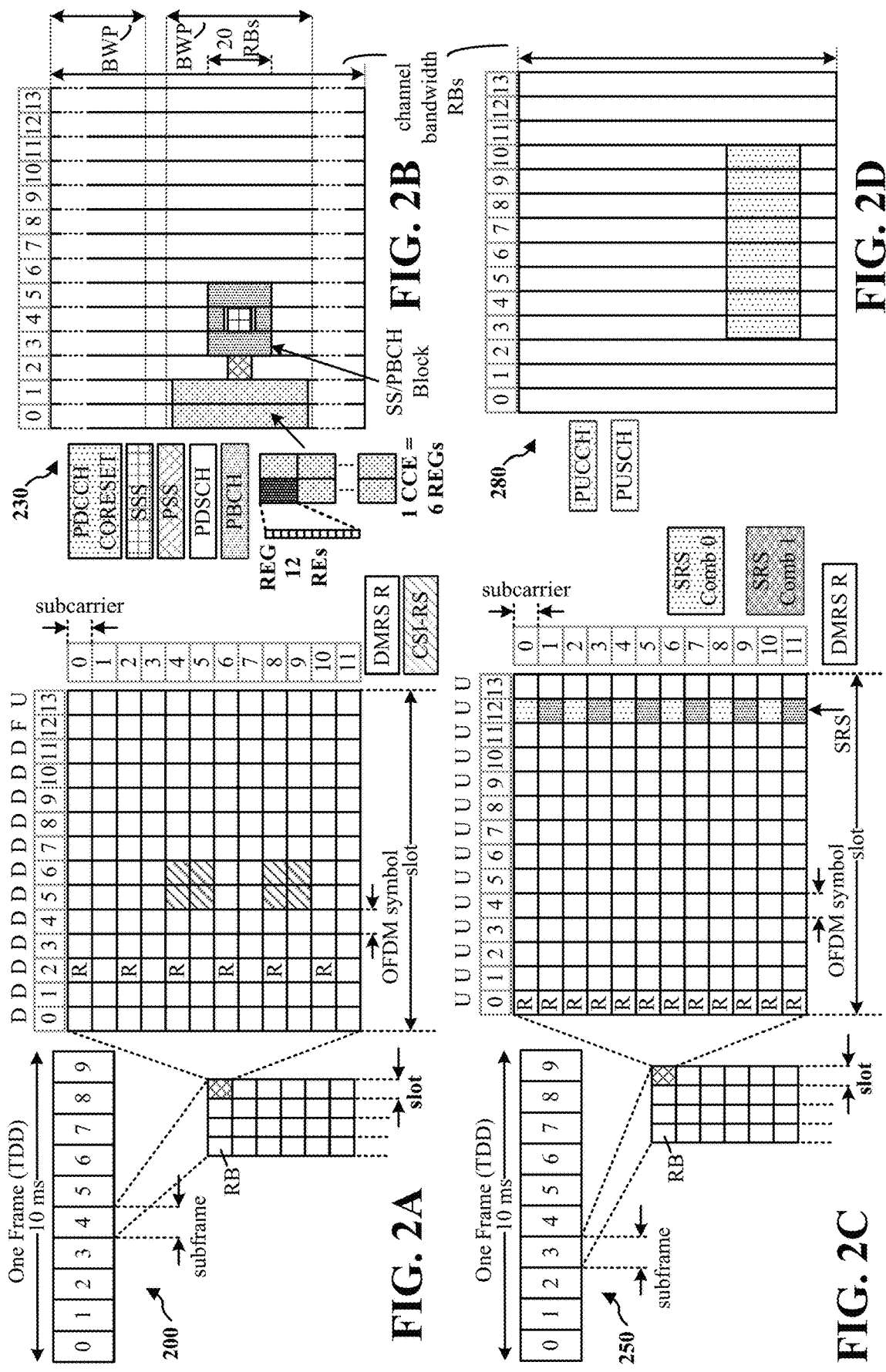
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
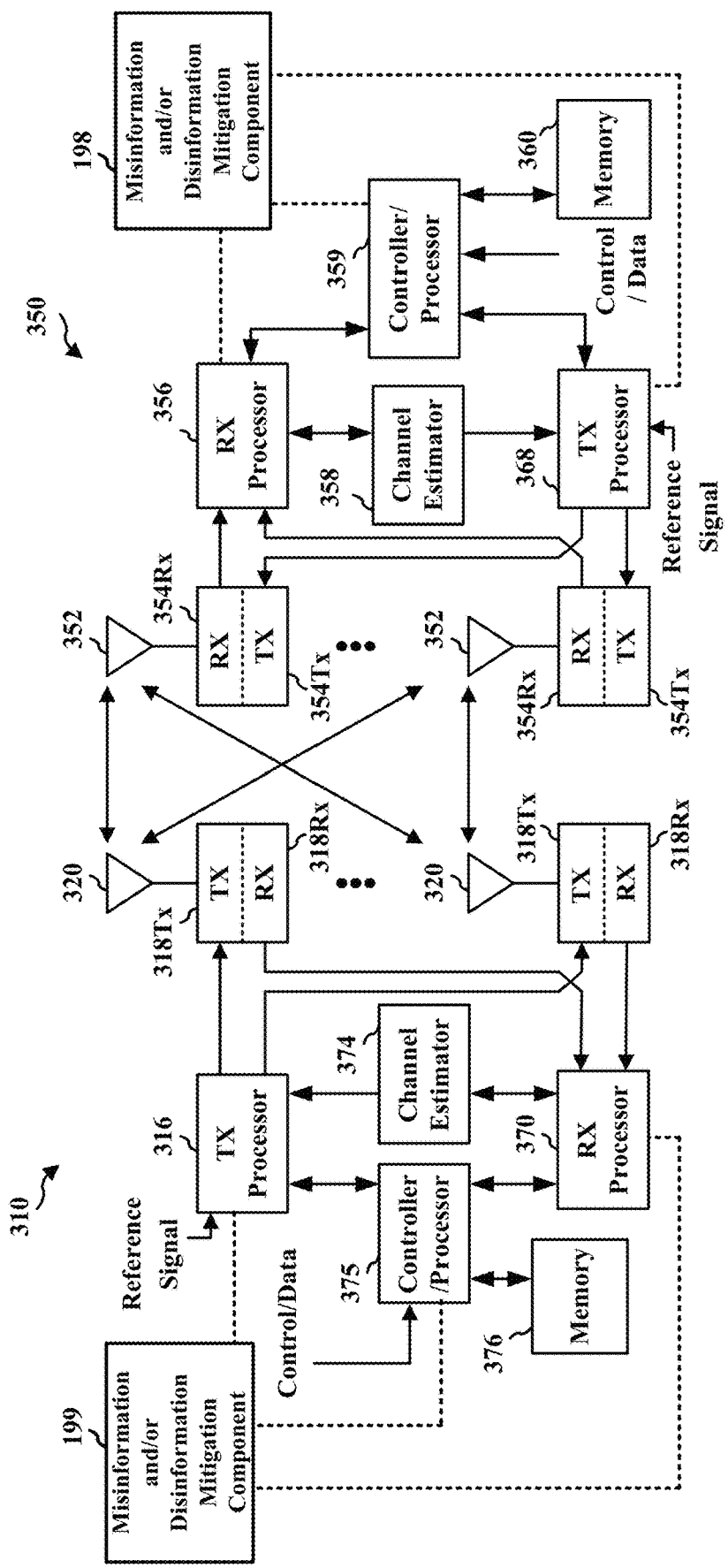
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the M/D-M component 198 of FIG. 1.

At least one of the TX processor 316, the RX processor 370, and the controller/processor 375 may be configured to perform aspects in connection with the M/D-M component 199 of FIG. 1.

In some aspects of wireless communication, a communication network may include perceptive wireless communication components. Perceptive wireless communications may relate to communication systems that are assisted by the perception of the physical environment/world. The perception of the physical environment/world, in some aspects, includes measurement data and machine learning feature data gathered from vehicular sensors, e.g., RADAR, LIDAR, cameras, GNSS, IMU sensors. Communications tasks that benefit from perception, in some aspects, include beam management, beam blockage prediction, beam refinement, etc.

In some aspects, sensing-related measurement data and feature data gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs, in-vehicle UEs, vehicles, vehicular sensors, GPS devices, and/or other similar devices providing data for processing by (or propagating through) one or more ML training/inference servers.

As a non-limiting example of perceptive wireless communication, sensing-related measurement data and feature data (e.g., data regarding a physical environment or objects in a surrounding environment) gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs (e.g., associated with a vulnerable road user or VRU), in-vehicle UEs, vehicles, vehicular sensors, GPS devices, and/or other similar devices providing data for processing by (or propagating through) one or more artificial intelligence (AI)/machine learning (ML) (AI/ML) training/inference servers and/or agents.

In some aspects, generative and/or discriminative learning may be used to identify (or classify) actors as honest (e.g., non-malicious) or malicious and may further be used to identify honest actors as being rogue (e.g., providing inaccurate information) or non-rogue (e.g., providing reliable/accurate information). In some aspects, a rogue actor may be referred to as an inaccurate actor, and a non-rogue actor may be referred to as an accurate actor. Other names or information properties or classifications may be used to distinguish between sources of accurate information and sources of inaccurate information.

An actor, in some aspects, may be an independent, active component contributing to the perceptive wireless communication (e.g., a particular perceptive wireless communication task). According to one or more examples, the rogue actor may be any of a sensor data collector (SDC), a vehicle along with its onboard sensors, an in-vehicle cellular UE, a pedestrian UE, and/or an ML training/inference host (e.g., a local component at a UE that processes data). Actors may be defined at different levels of granularity, e.g., a vehicle (together with its onboard sensors) may be an actor at a first level of granularity and/or a single SDC on the same vehicle could be another actor at a second level of granularity.

Actors may be classified as one of a plurality of different types of actors, e.g., as honest (non-rogue) actors, non-malicious (misinforming or unintentional) rogue actors, or malicious (disinforming or intentional) rogues and that the methods below may be applied to disinforming rogue actors. An honest actor may refer to an actor or device that provides accurate/correct information to the network or to another device in the network, and may also be referred to as a non-rogue actor or device.

In some aspects, rogue actors may include actors providing inaccurate, misleading, or false information. The inaccurate, false, or misleading information may also be referred to as misinformation, disinformation, or unreliable information. There may be different types of rogue actors. For example, some rogue actors may unintentionally (e.g., without being aware that the data is inaccurate, false, or misleading) provide inaccurate or misleading information to the network, such as location information from the GNSS sensor of a vehicle during a period of acceleration. Accurate information may also be referred to as reliable information. A rogue actor that unintentionally provides inaccurate, false, or misleading data may be referred to as a non-malicious rogue actor. Another type of rogue actor or device may intentionally provide inaccurate, false, or misleading information, and may be referred to as a malicious rogue actor.

Rogue actors (e.g., actors whose information has errors with high mean and/or high-variance; actors whose information is misleading, incorrect, inaccurate, mistaken, corrupted, and/or deceptive) can introduce or cause error propagation at multiple stages of a perceptive wireless communication procedure. A rogue actor may supply incorrect information to the process either deliberately, based on a failed sensor, and/or based on tampering by an external agent. Incorrect information, in some aspects may be supplied unintentionally and may be based on a more transitory basis than disinformation, for example, based on a transitory situation/context such as during a maneuver that causes one or more types of information to be incorrect or misleading. Intentional inaccurate or incorrect information may be referred to as disinformation, whereas unintentional inaccurate/incorrect information may be referred to as misinformation. In some aspects, for a misinforming actor, other (non-rogue) actors (e.g., UEs) in the same environment and/or context, having received a same configuration from the network as the misinforming actor, may send incorrect values for the same data element with a (same) non-zero probability. In other words, a misinforming actor may be a non-malicious actor such that other non-malicious actors in a similar (or same) location receiving a same configuration from the network would be likely (with a non-zero probability) to provide incorrect information. However, for a disinforming actor, other (non-rogue) actors (e.g., UEs) in the same environment and/or context, having received a same configuration from the network as the disinforming actor, may transmit incorrect values for the same data element with probability nearing zero. For example, a disinforming actor may be a malicious actor such that non-malicious actors in a similar (or same) location receiving a same configuration from the network would not be likely to provide incorrect information (e.g., with a probability near zero).

The misleading or incorrect information (e.g., misinformation) may include a set of data elements including one or more of raw sensing data, bounding boxes (indicating a spatial extent of an identified object), and other features extracted from onboard ML models, UE/wireless device location, UE/wireless device orientation/velocity, and/or beam measurements at the UE. For either disinformation or misinformation, incorrect outputs (data elements received from a rogue actor) at a first operation (or to a first network, or wireless, device) may lead to incorrect inputs/outputs at the next operation (or for another network, or wireless, device) of a perceptive wireless communication task. For example, incorrect information relating to bounding boxes of different objects in a first environment may lead to an incorrect beam blocking prediction. Therefore, one or more rogue actors can severely degrade the benefits of coordination among multiple actors, most of which may not be rogue actors. The ability to produce accurate results in the presence of such rogue actors may improve the usefulness (e.g., accuracy) of the perceptive wireless communication.

A rogue actor may supply incorrect information to the process either deliberately or unintentionally (e.g., based on a failed sensor or other situational/contextual issues). For either disinformation or misinformation, incorrect outputs (data elements received from a rogue actor) from one operation may lead to incorrect inputs/outputs at a related operation. For example, incorrect information relating to bounding boxes of different objects in a first environment may lead to an incorrect beam blocking prediction. In some aspects, misinformation may be caused by intermittent occlusion of a sensor in consecutive time instants leading to inconsistent estimates of the environment, or a (rapidly) changing location, velocity, and/or relative position of elements and/or devices in the environment. In some aspects, each vehicle may be assumed to have a central computing and/or memory equipment that is independent of the onboard computer and may be assumed to be tamper-proof. Unlike the case of misinformation, a sensor may not be counted as an independent actor in the case of disinformation. In some aspects, the disclosure is based on (1) a central network entity such as a base station that operates without external tampering (e.g., is tamper-proof), (2) one or more vehicular UEs that have central equipment that operate without external tampering (e.g., is tamper-proof) or that are assumed tamper-proof (e.g., cannot be modified by an external source), and (3) that trusted vehicular UEs can maintain the access permissions of their own onboard sensors and computers. For example, as long as the vehicle is not rogue (e.g., the central equipment remains untampered and/or unmodified), the vehicle may control the exclusion of any disinforming sensors (including tampered or damaged sensors). The vehicle control of the exclusion may be indicated to the vehicle by a network entity in a wireless network. The vehicle control of the exclusion may be indicated to the vehicle by a network entity in a wireless network, and the vehicle may in turn, indicate to a central network entity in a wireless network for the central network entity to exclude the information associated with the disinforming sensors.

For the following discussion, it may be assumed the actors have already been classified between different types of actors as honest (non-rogue), non-malicious (misinforming or unintentional) rogues, or malicious (disinforming or intentional) rogues) and that the methods below may be applied to disinforming rogue actors. In some aspects, generative and/or discriminative learning may be used to identify (or classify) actors as honest, non-malicious, or malicious and may further be used to identify actors as being rogue (e.g., providing misinformation) or non-rogue (e.g., providing reliable information). In some aspects, non-malicious may generally refer to both misinforming and honest actors as neither purposely provides incorrect or misleading information. In some aspects, a rogue actor may be referred to as an inaccurate actor, and a non-rogue actor may be referred to as an accurate actor. Other names or classifications may be used to distinguish between sources of accurate information and sources of inaccurate information. In some aspects, generative and/or discriminative learning may include learning the distribution of incoming data for each environment and subsequently identifying outliers. The generative learning model may include one or more of generative adversarial networks (GANs), variational autoencoders (VAEs), or other generative/discriminative algorithms.

For example, a generator network, G, may learn a distribution of the external incoming dataset/datastream and generate a sample (for a given noisy seed) with the aim of making it indistinguishable from the external incoming dataset to a discriminator network, D. The discriminator network, D, may be used, for a given input (picked arbitrarily from either G or the dataset), to learn and return a likelihood that the input is drawn from the dataset/datastream and is not a creation of the generator G.

Accordingly, training the rogue identification modules could involve training (1) a unique generator $G_0$ with multiple $D_n$'s, (2) multiple $G_m$-$D_n$ pairs, and (3) multiple $G_m$'s with one $D_0$ acting as classifier (uniquely-trained $G_m$'s for highway, intersections, etc.) Further, a rogue identification module might be trained to individually identify errors at each stage of the beam management procedure and jointly identify multiple errors accumulated over multiple stages of the beam management procedure.

For an honest rogue actor, the errors (e.g., misinformation) may persist for an extended time period (e.g., a 'misinformation period' having a duration of seconds to minutes/hours) but may ultimately be temporary. The perceptive wireless communication system, in accordance with some aspects of the disclosure, may be provided with a method to temporarily exclude and/or discard data from such honest rogue actors during the duration of the misinformation period while accepting/propagating data from the honest actors after the misinformation period is over and the data from the actor is expected to be accurate and/or reliable again. Blocking, revoking the access permissions, inclusion on an access revocation list, or changing the access key for the actor permanently, could lead to (1) disregarding all future information from the actor (including accurate and/or reliable information) and (2) a state in which most, or substantially all, of the actors are blocked such that the network stops receiving data from the actors even after the information becomes accurate and/or reliable. Either of these outcomes may reduce the usefulness of the perceptive wireless communication system. However, constant re-evaluation may increase overhead for the actors and the network.

For a disinforming rogue actor, the errors may be assumed to be permanent (or effectively permanent or near-permanent) such that the disinforming rogue actor may be permanently blocked (e.g., access permission may be permanently revoked). The permanent blocking may include placing an identifier of the disinforming rogue actor into a list, database, or other data structure of blocked actors. The system, in some aspects, may not provide a time-based criteria for reassessment. In some aspects, reassessment criteria may be provided that relate to replacement or repair of the rogue components or actors (e.g., malfunctioning sensors, in-vehicle cellular UEs, etc.). The disinformation may take the form of (or may be implemented by the disinforming rogue actor as) modified packets (e.g., transmitted information) and/or packets designed to imitate valid packets from the actor. The modification and/or imitation, in some aspects, may involve one or more of (1) spoofing or utilizing the identifying information of another actor, (2) matching a location, speed, RSRP, or other characteristic (e.g., a past and/or out of date value) associated with the disinforming rogue actor, (3) distorting machine learning outputs (such as bounding boxes, their confidences), and/or (4) modifying packets, delaying packets and/or creating duplicates of packets (e.g., for V2V communications). In some aspects, the disinformation may lead to (or be intended to lead to) reallocation of cellular resources, traffic jams, and accidents.

In some aspects, detection of intentional tampering by a disinforming rogue actor may be identified and/or detected by a combination of AI/ML and non-AI/ML algorithms trained to detect evidence of tampering from the incoming sensing and other quantitative data. For example, fabricated sensing images and/or measurement data may be detected by GANs, VAEs, or other generative/discriminative algorithms.

In some aspects altered packets (checksum) and/or duplicated or imitated packets (sensing data, history) may be detected by dedicated algorithms. Based on the detection and/or identification, permission may be revoked for the source of tampered information. By revoking the permission, the system and/or network entity may prevent information received from the disinforming rogue actor from being accepted as input for propagation and/or processing by the network entity or network function associated with the network entity.

In some aspects, if an actor is classified as a disinforming rogue by the classifier its access permissions may be revoked. The access permission revocation, in some aspects, may be achieved by placing the actor on an access list (e.g., a block or restricted access list). In some aspects, the access list may be used to manage access to a set of service entities that utilize information collected from multiple UEs to improve wireless communication or provide services to the individual participating UEs to improve wireless communication as described above. Management of access to the set of service entities, in some aspects, may be limited on a case-by-case basis, e.g., as a service-based access and/or subscription. For example, a vehicular UE that is an honest actor with a damaged onboard camera may be determined to be disinforming in relation to the image data or other data derived from the onboard camera sensing data and may have its access to image-based ML services revoked. Based on the determination that the vehicular UE is an honest actor, the vehicular UE may retain access to other service entities associated with other sensors or data sources of the vehicular UE. In some aspects, the loss of access to the image-based ML services may persist as long as the camera is not replaced, e.g., the loss of access may be permanent as far as the particular onboard camera is concerned. The access permission revocation, in some aspects, may be context-based such that a vehicular UE whose feature extraction outputs are being classified as deliberately misleading in particular contexts (e.g., when at busy intersections) but not in other contexts, may have its access to ML services revoked only in the context of busy intersections.

For vehicle to vehicle (V2V) communication, each vehicle or vUE may maintain information regarding a set of relevant actors (e.g., an access list). The information may be based on one or more classification operations (e.g., operations to classify actors as honest, misinforming, or disinforming) at different levels of granularity and/or performed by different network components (e.g., base stations, network entities, ML service entities, etc.). A vUE, in some aspects, may determine access permissions and/or revocations based on classifications of one or more of associated sensors of the vUE, (temporarily) neighboring vUEs (and their associated sensors and devices) maintaining V2V links, road side units (RSUs) associated with frequently visited locations. In some aspects, an SDC may determine access permissions/revocations among all the sensors that act as its sources of information. For example, an access list may be generated based on various stages of an ML or non-ML service/procedure (in perceptive wireless communications or otherwise), e.g., data collection, feature extraction, feature aggregation, and so on. An access list, in some aspects, may be generated independently and/or in coordination with other actors (e.g., a base station, network entity, RSUs, neighboring vUEs, etc.).

In some aspects, the set of relevant actors may include actors that have a non-negligible probability of interacting with the vUE during a preceding or a following time period (of a known or configured duration). The determination of the set of relevant actors, in some aspects, may be made by one or more of the vUE, a central network entity such as a base station or network service entity, a neighboring vUE (provided that the neighboring vUE is permitted by the first vUE to determine and communicate lists of relevant actors). In some aspects, a relevant actor may be categorized as non-rogue or trustworthy (will not have access revoked) or categorized as rogue or untrustworthy (will have access revoked) for a set of zero or more services and contexts.

For situations associated with separate transmissions of the same data to various actors, separate local determinations of classifications of actors (e.g., as one of rogue (misinforming and/or disinforming), or honest) may be made by the various actors (e.g., vUEs, UEs, network entities, etc.). For example, when a data element (e.g., image from front camera) is an input, exclusively, to a V2V application, such as sensor sharing, the rogue detection procedure for all the services relevant to that V2V application and data element may be executed entirely locally. When a data element is an input to both vehicle to infrastructure (V2I) and V2V applications, the procedures for disinforming rogue detection may, in some aspects, be made separately at the central and local levels. Each determination may come to a same, or different, conclusion, as to whether to classify an actor (e.g., a source of a particular data element or type of information in a data element of set of data elements) as a misinforming actor, a disinforming actor, or an honest (non-rogue) actor for each of a plurality of services and/or contexts. Accordingly, each vUE in a particular area may maintain a corresponding data structure for identifying the different actors in the area (or actors otherwise associated with the vUE) and may include different classifications for one or more actors.

In some aspects, one or more data elements (e.g., information from one or more components of an actor that may be communicated to other devices) may be unaltered in the packets transmitted for V2I services, and still be altered and misleading in the corresponding packets sent to some vUEs for V2V services. For example, a disinforming vUE may be aware of a likelihood (or probability) that a destination of a data element (or set of data elements) may be able to independently confirm (or reject) the information included in the data element and, based on the likelihood may determine whether to alter the data element before transmission. In some aspects, a disinforming actor may alter transmission regarding a radar point cloud associated with an object and/or vehicle when transmitting to a first vUE (or network entity) that has no line-of-sight to the object/vehicle and is unlikely to be able to independently verify (or reject) the data (or lacks associated sensors that may be used to independently verify the information). Alternatively, the disinforming actor may transmit unaltered data to a second vUE that has a line of sight to the object and/or vehicle and is therefore likely to be able to independently verify (or reject) the information. In some aspects, the alteration of the data elements (or packets) may be intended to cause a combination of accidents, traffic jams, or reallocation of cellular resources.

Figure 4:
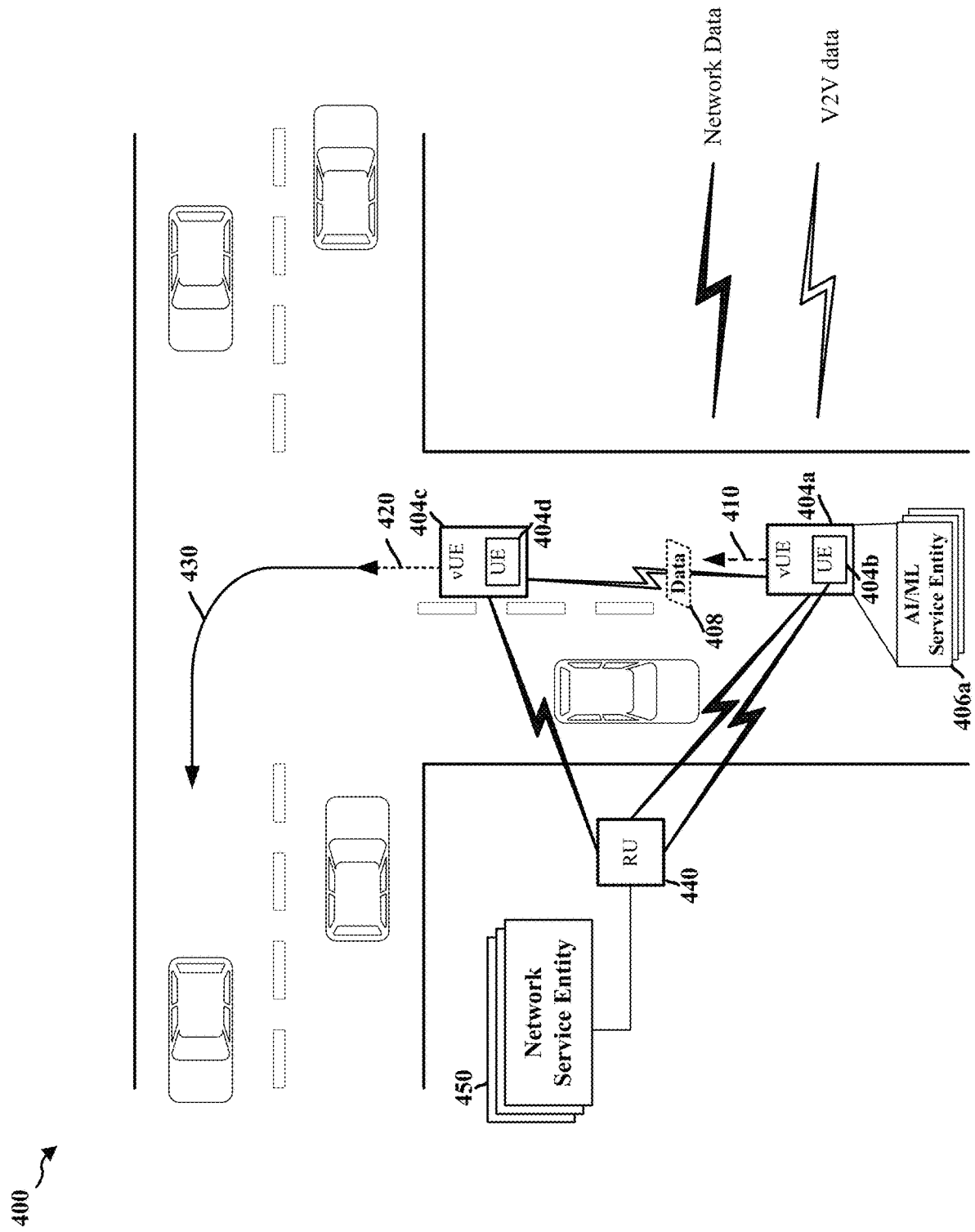
FIG. 4 is a diagram illustrating a first situation in which sensor sharing may be used to compensate for misinformation in accordance with some aspects of the disclosure.

FIG. 4 is a diagram 400 illustrating a first situation in which sensor sharing may be used to compensate for misinformation in accordance with some aspects of the disclosure. A first vUE 404a may have an established V2V connection with a second vUE 404c for sensor sharing (e.g., for receiving and/or transmitting data elements including information from sensors or the output of an analysis of locally-available data) associated with data captured by sensors of the vUE 404c and/or vUE 404a, respectively, or associated UEs 404d and/or 404b, respectively). Each of the vUEs 404a and 404c, in some aspects, may also be associated with a set of local service entities (e.g., AI/ML service entities 406a associated with vUE 404a). The local service entities, in some aspects, may be a set of local service entities associated with different data processing operations, e.g., sensor data processing and/or aggregation (e.g., for bounding box identification or collision prediction/avoidance operations based on data from one or more local sensors), rogue (misinforming and/or disinforming) actor detection (based on data elements received from other UEs or vUEs), and/or additional functions of the associated vUE. The local rogue actor detection, in some aspects, may affect how the vUE generates data for transmissions (or processes received data) associated with sensor sharing (e.g., V2V sensor sharing) or perceptive wireless communication. In some aspects, the local rogue actor detection may further effect one or more of V2V communications such as basic safety messages (BSMs), advanced driver-assistance systems (ADASs) and maneuvering messages, platooning (e.g., vehicle-to-platoon-lead) communication, and/or relaying messages to or from other vUEs.

In some aspects, each of vUE 404a, UE 404b, and vUE 404c may have an established connection (e.g., a V2I connection) with a RU 440 (e.g., an RSU or other TRP) which is used to share data for perceptive wireless communication. The RU 440, in some aspects, may be associated with one or more network service entities 450. The network service entities 450, may include AI/ML service entities providing similar functions to those provided by the local service entities at the UEs and/or vUEs (e.g., AI/ML service entities 406a) based on input (e.g., data elements) from multiple UEs and/or vUEs (e.g., data associated with perceptive wireless communication). The one or more network service entities 450, in some aspects, may additionally provide control information for remote driving applications for vUEs and/or may manage beamforming operations based on the input from the multiple UEs and/or vUEs.

In some aspects, the one or more network service entities 450 may identify vUE 404c as a misinforming rogue actor based on a data element including incorrect and/or misleading location information. The incorrect and/or misleading information identified by the one or more network service entities 450 may be based on a deceleration 420 and/or a turn 430 during which location information may not be accurately captured or may be changing too rapidly to be of use. The one or more network service entities 450 (or the RU 440) may transmit an indication to nearby UEs and/or vUEs that the vUE 404c has been classified and/or identified as a misinforming rogue actor for a set of contexts (e.g., certain information, or a set of information types, has been determined to be incorrect or misleading in a set of contexts or for a set of processes and/or services).

However, the AI/ML service entities 406a of the vUE 404a, in some aspects, may receive sensor sharing data 408 and determine that, based on additional information available at the vUE 404a (e.g., local sensor data such as images, radar point clouds, etc.), that the classification of the vUE 404c indicated by the one or more network service entities 450 (or the RU 440) may be inaccurate. For example, the vUE 404a may determine based on local sensor data, a local (constant) velocity 410, and the data 408 received from the vUE 404c, that the incorrect and/or misleading information identified by the one or more network service entities 450 or the RU 440 may be interpreted correctly in light of the local sensor data (e.g., that sensor sharing may be used to compensate for the identified misinformation). For example, if a location provided by vUE 404c is indicated to be incorrect or misleading (e.g., inaccurate) during a turning operation, the vUE 404a may be able to compensate for the inaccuracy based on its own location data and a set of sensor data (e.g., a RADAR/LIDAR point cloud, image data, etc.).

In some aspects, if the one or more network service entities 450 identify vUE 404c as a rogue actor (either disinforming or misinforming), the one or more network service entities 450 (or the RU 440) may transmit an indication to nearby UEs and/or vUEs that the vUE 504c has been classified and/or identified as a rogue actor for a set of contexts. However, the AI/ML service entities 406a of the vUE 404a, in some aspects, may classify and/or determine that, based on additional information available at the vUE 404a (e.g., local sensor data such as images, radar point clouds, velocity 410, etc.), the vUE 404c is an honest actor (e.g., that the classification of the vUE 404c indicated by the one or more network service entities 450, or the RU 440, may be inaccurate). Subsequently, vUE 404a may choose to re-classify vUE 404c locally (e.g., for determining the behavior of vUE 404a) and apply the relevant actions. For instance, vUE 404a may re-classify the vUE 404c as an honest actor in one or more contexts for one or more services and not terminate the V2V link based on the classification from the one or more network service entities 450 (or the RU 440). The vUE 404a, in some aspects, may communicate the local re-classification to the network (e.g., via RU 440) and/or directly to the vUE 404c. The re-classification, in some aspects, may be communicated at the time of re-classification (e.g., to the network and/or the vUE 404c to request a re-evaluation) and/or as part of a peer information history transmission as will be discussed in relation to FIGS. 6 and 7 below.

Figure 5:
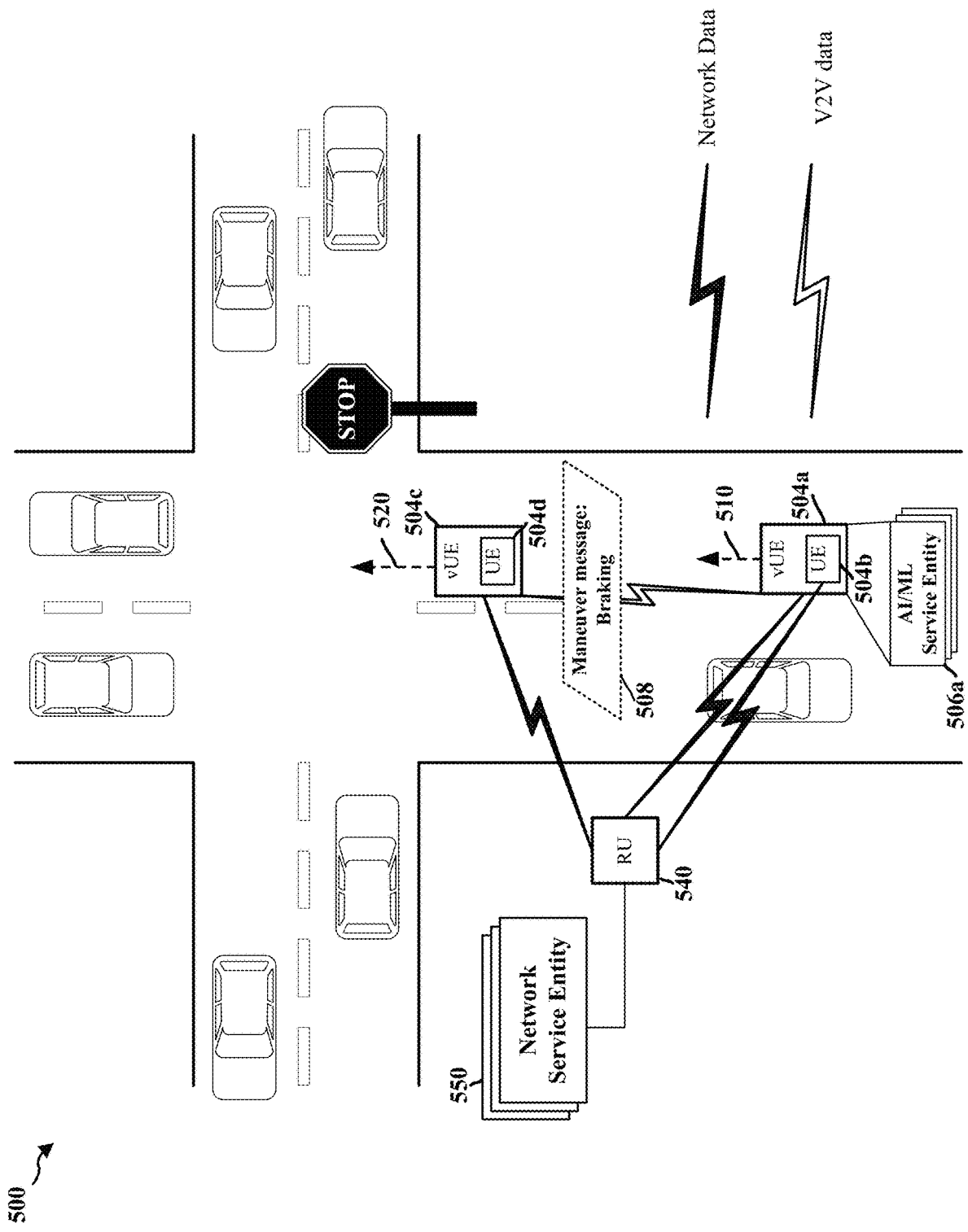
FIG. 5 is a diagram illustrating a second situation in which sensor sharing may be used to identify disinformation from a vehicular UE (vUE) in accordance with some aspects of the disclosure.

FIG. 5 is a diagram 500 illustrating a second situation in which sensor sharing may be used to identify disinformation from a vUE in accordance with some aspects of the disclosure. A first vUE 504a may have an established V2V connection with a second vUE 504c for sensor sharing (e.g., for receiving and/or transmitting data elements associated with data captured by sensors of the vUE 504c and/or vUE 504a, respectively, or associated UEs 504d and/or 504b, respectively). Each of the vUEs 504a and 504c, in some aspects, may also be associated with a set of local service entities (e.g., AI/ML service entities 506a associated with vUE 504a). The local service entities, in some aspects, may be a set of local service entities associated with different data processing operations, e.g., sensor data processing and/or aggregation (e.g., for bounding box identification or collision prediction/avoidance operations based on data from one or more local sensors), rogue (misinforming and/or disinforming) actor detection (based on data elements received from other UEs or vUEs), and/or additional functions of the associated vUE. The local rogue actor detection, in some aspects, may affect how the vUE generates data for transmissions (or processes received data) associated with sensor sharing (e.g., V2V sensor sharing) or perceptive wireless communication. In some aspects, the local rogue actor detection may further effect one or more of V2V BSMs, ADASs and maneuvering messages, platooning (e.g., vehicle-to-platoon-lead) communication, and/or relaying messages to or from other vUEs.

In some aspects, each of vUE 504a, UE 504b, and vUE 504c may have an established connection (e.g., a V2I connection) with a RU 540 (e.g., an RSU or other TRP) which is used to share data for perceptive wireless communication. The RU 540, in some aspects, may be associated with one or more network service entities 550. The network service entities 550, may include AI/ML service entities providing similar functions to those provided by the local service entities at the UEs and/or vUEs (e.g., AI/ML service entities 506a) based on input (e.g., data elements) from multiple UEs and/or vUEs (e.g., data associated with perceptive wireless communication). The one or more network service entities 550, in some aspects, may additionally provide control information for remote driving applications for vUEs and/or may manage beamforming operations based on the input from the multiple UEs and/or vUEs.

In some aspects, the one or more network service entities 550 may identify vUE 504c as an honest actor based on a data element including correct and/or accurate location information. The one or more network service entities 550 (or the RU 540) may transmit an indication to nearby UEs and/or vUEs that the vUE 504c has been classified and/or identified as an honest actor for a set of contexts. However, the AI/ML service entities 506a of the vUE 504a, in some aspects, may receive maneuver message 508 (e.g., a message indicating that vUE 504c is braking) and determine that, based on additional information available at the vUE 504a (e.g., local sensor data such as images, radar point clouds, velocity 510, etc.), that the vUE 504c is not braking (has a constant velocity 520) and that the classification of the vUE 504c indicated by the one or more network service entities 550 (or the RU 540) may be inaccurate (e.g., that the vUE 504c may be a disinforming rogue actor). Subsequently, vUE 504a may choose to re-classify vUE 504c locally (e.g., for determining the behavior of vUE 504a) and apply the relevant actions. For instance, vUE 504a may re-classify the vUE 504c as a disinforming rogue actor in one or more contexts for one or more services and terminate the V2V link corresponding to the maneuver message 508. The vUE 504a, in some aspects, may communicate the local re-classification to the network (e.g., via RU 540). The re-classification, in some aspects, may be communicated at the time of re-classification and/or as part of a peer information history transmission as will be discussed in relation to FIGS. 6 and 7 below.

Figure 6:
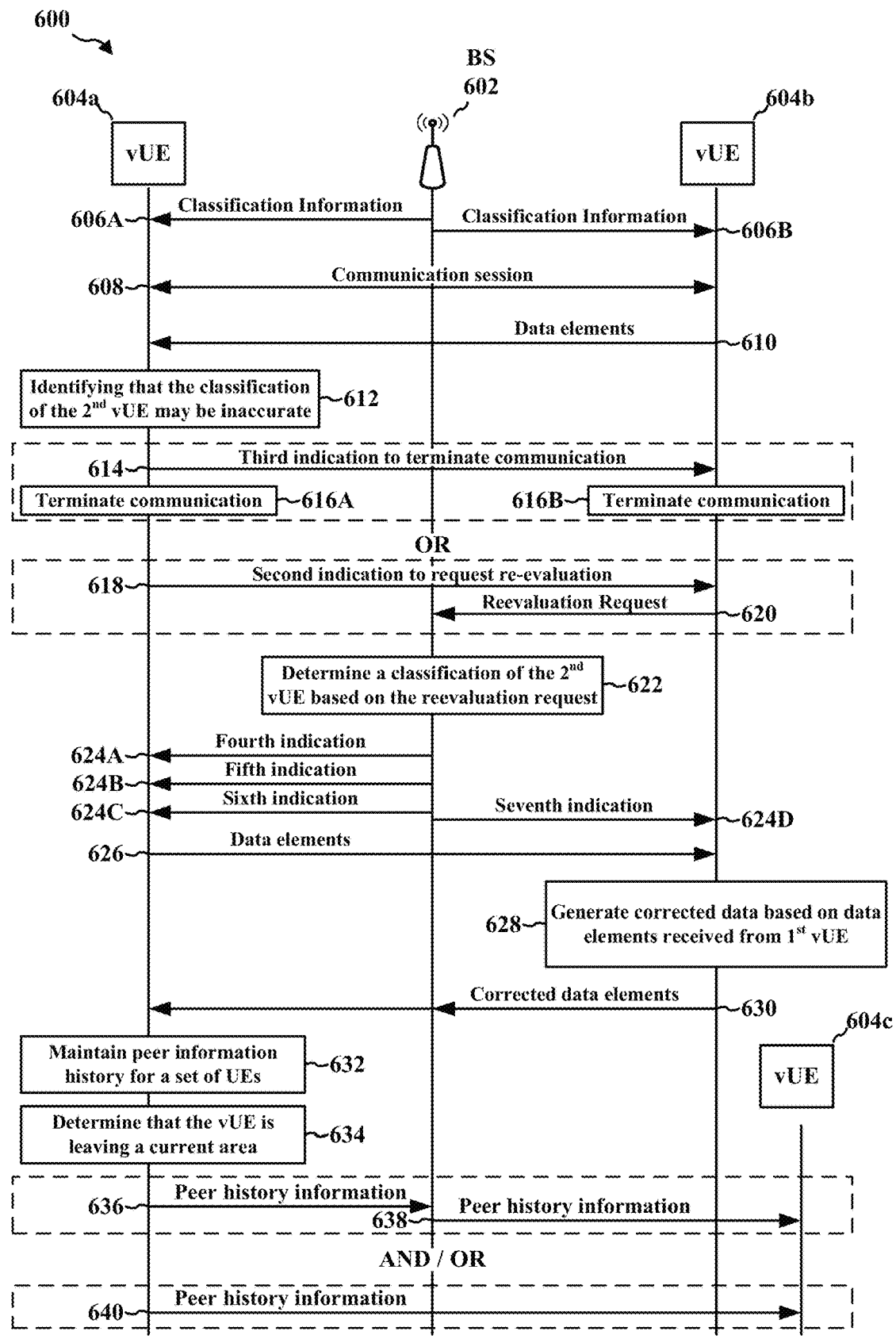
FIG. 6 is a call flow diagram illustrating communications between vUEs and a network device for perceptive wireless communication in accordance with some aspects of the disclosure.

FIG. 6 is a call flow diagram 600 illustrating communications between vUEs (e.g., vUE 604a, vUE 604b, and vUE 604c) and a network (e.g., a base station 602) for perceptive wireless communication in accordance with some aspects of the present disclosure. Before the communications illustrated in call flow diagram 600, the base station 602, in some aspects, may receive data elements from one or more actors (e.g., vUEs, UEs, sensors, or other actors as described above) for perceptive wireless communication and may receive one or more indications from other network entities regarding classifications of a group of actors that may include some, or all, of the one or more actors. The base station 602 or a network (service) entity associated with the base station 602, in some aspects, may classify the one or more actors from which the data elements were received as providing data of a first type associated with one of an honest actor, a misinforming (rogue) actor, or a disinforming (rogue) actor based on the received data elements and classification indications.

Based on the classification performed at the base station 602 (and the classification indications received from other network entities), the base station 602 may transmit, and vUEs 604a and 604b may respectively receive, classification information 606A and classification information 606B. The classification information 606A and/or 606B, in some aspects, may indicate a classification of one or more vUEs (or other actors) in an area (e.g., sub-cell 1, sub-cell 2, and/or sub-cell 3 of FIG. 7) associated with the receiving vUE. The indication of the classification for a particular vUE (or other actor), in some aspects, may include an indication that the vUE has been classified as providing one of correct information (e.g., has been classified as an honest actor) or incorrect and/or misleading information (e.g., has been classified as one of a misinforming actor or a disinforming actor). The indication of the classification, in some aspects, may be implied in an access list indicating a set of actors and associated permissions and/or revocations (e.g., an indication of services for which the data provided by the actor may be used or is to be discarded and/or ignored).

After receiving the classification information 606B, the vUEs 604a and 604b may establish a communication session 608. The communication, in some aspects, may be associated with one or more of a sensor sharing operation, BSMs, ADASs, maneuvering messages, platooning (e.g., vehicle-to-platoon-lead) communication, and/or a perceptive wireless communication. The communication, in some aspects, may be a V2V communication that is transmitted directly between the vUEs 604a and 604b.

After establishing the communication session 608, the vUE 604b, may transmit and vUE 604a may receive, data elements 610 for one of sensor sharing or perceptive wireless communication. The vUE 604a, in some aspects, may identify, at 612, that the classification of the second vUE (e.g., vUE 604b) may be inaccurate. If, for example, the classification of the vUE 604b indicates that the vUE 604b provides incorrect and/or misleading information, the identification, at 612, may be based on an identification of data available at the vUE 604a that may be used to compensate for inaccuracies or distortions found in data provided by the vUE 604b (as in the example provided in relation to FIG. 4). However, if the classification of the vUE 604b indicates that the vUE 604b provides correct information, the identification, at 612, may be based on an identification of data available at the vUE 604a that may be identified as one or more of misinformation and/or disinformation provided to vUE 604a by the vUE 604b (as in the example provided in relation to FIG. 5).

Based on the identification, at 612, that the classification of the second vUE (e.g., vUE 604b) may be inaccurate, the vUE 604a may transmit, and the vUE 604b may receive, a third indication 614 to terminate the communication session 608. For example, if the vUE 604a, identifies that the data elements are not consistent with local information collected by one or more sensors of the vUE 604a or additional wireless devices providing information to the vUE 604a. The vUEs 604a and 604b may then terminate the communication session 608 at 616A and 616B, respectively.

Based on the identification, at 612, that the classification of the second vUE (e.g., vUE 604b) may be inaccurate, the vUE 604a may transmit, and the vUE 604b may receive, a second indication 618 to request a re-evaluation. Based on the second indication 618 to request a re-evaluation, the vUE 604b may transmit, and base station 602 may receive, a re-evaluation request 620. The re-evaluation request 620, in some aspects, may include information regarding the data available at the vUE 604a that is the basis of the re-evaluation request 620. In some aspects, the re-evaluation request 620 may be related to specific contexts for which data from the vUE 604b classified as providing incorrect and/or misleading data may not be used or for which the data from the vUE 604b classified as providing correct data may be used.

Based on the re-evaluation request 620, the base station 602 may, at 622, determine (e.g., via a re-evaluation operation) an updated classification of the second vUE (e.g., vUE 604b). The updated classification of the second vUE, in some aspects, may be different from the original classification indicated in the classification information 606A and/or 606B for at least one context (e.g., a classification associated with one type of data and/or one service entity). The base station 602, in some aspects, may then transmit, and vUE 604a may receive, a fourth indication 624A indicating for the vUE 604a to transmit the information available at the vUE 604a to the vUE 604b for the vUE 604b to correct the incorrect information. The base station 602, in some aspects, may also transmit, and vUE 604a may receive, a fifth indication 624B indicating for the vUE 604a to transmit corrected information to the second wireless device. In some aspects, the corrected information may be based on the second set of data elements and the first information available at the vUE 604a. The base station 602, in some aspects, may also transmit, and vUE 604a and/or vUE 604b may receive, a sixth indication 624C and/or a seventh indication 624D that the vUE 604b has been re-classified as providing data of a second type (e.g., correct information). In some aspects, the seventh indication 624D, may also include an indication for the vUE 604b to receive data elements from the vUE 604a to use to correct incorrect information produced at the vUE 604b. The reclassification information included in the sixth indication 624C and/or the seventh indication 624D, in some aspects, may include an updated classification for the subject of the re-evaluation request 620. For example, the reclassification information included in the sixth indication 624C and/or the seventh indication 624D, in some aspects, may include an additional indication that the vUE 604b has been re-classified as one of providing correct information or as providing incorrect and/or misleading information (e.g., in association with one or more contexts or services).

Based on the fourth indication 624A or the fifth indication 624B, the vUE 604a may transmit, and the vUE 604b may receive, a set of data elements 626 that include data or information available at the vUE 604a (or corrected information based on the data or information available at the vUE 604a), but not at the vUE 604b, that the vUE 604b may use to correct inaccurate, incorrect, or misleading information. For example, information from sensors (e.g., RADAR, LIDAR, cameras, etc.) of the vUE 604a may be provided to help with a local determination of a bounding box (or other position and/or location information) associated with the vUE 604b. The vUE 604b, in some aspects, may generate, at 628, corrected data based on the data elements 626. The data elements 630 generated at 628 may then be transmitted by vUE 604b and may be received by base station 602 or vUE 604a.

Figure 7:
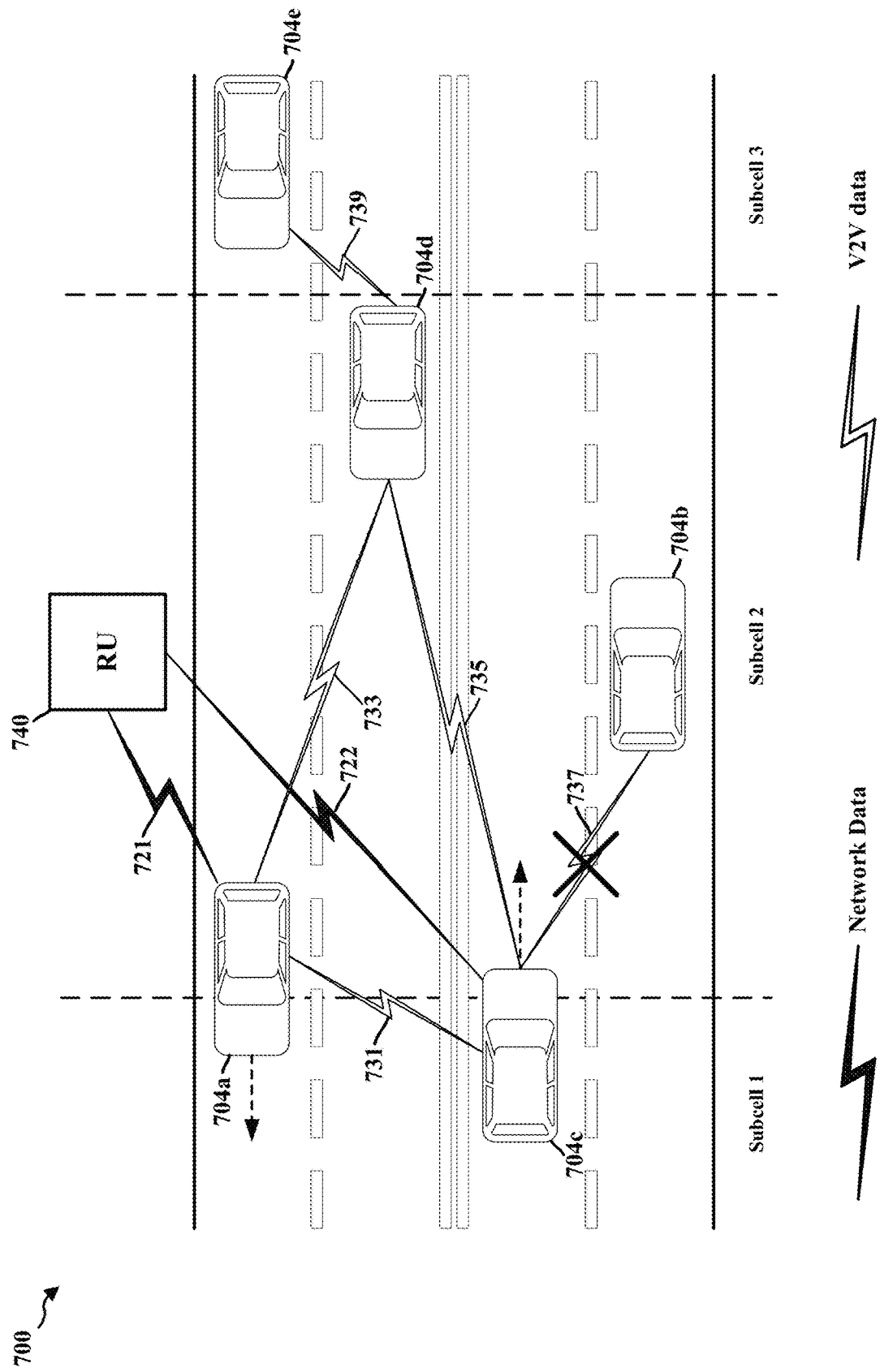
FIG. 7 is a diagram illustrating vUEs in different areas associated with at least one radio unit (RU).

FIG. 7 is a diagram 700 illustrating vUEs (e.g., vUE 704a, vUE 704b, vUE 704c, vUE 704d, and vUE 704e) in different areas (e.g., sub-cell 1, sub-cell 2, or sub-cell 3) associated with at least one RU 740. FIG. 7 may be used to illustrate one example of the implementation of the remaining elements of FIG. 6 in accordance with some aspects of the disclosure. For example, the vUE 604a (corresponding to vUE 704a), in some aspects, may maintain, at 632, independent peer history information regarding a set of wireless devices (e.g., UEs, vUEs, RUs, etc.) that are determined to be relevant to the vUE 604a, e.g., in an area associated with the network device and the first wireless device (e.g., such as vUEs 704b and 704d in a same sub-cell 2 or other UEs and/or vUEs that may be in the sub-cell 2). As discussed above, in some aspects, the relevant actors may include actors that have a non-negligible probability of interacting with the vUE 604a during a preceding or a following time period (of a known or configured duration). The determination of the set of relevant actors, in some aspects, may be made by one or more of the vUE itself, a central network entity such as a base station or network service entity, a neighboring vUE (provided that the neighboring vUE is permitted by the first vUE to determine and communicate lists of relevant actors).

Each vUE (e.g., vUEs 704a-704e) may determine a local set of relevant actors (e.g., independent peer history information) based on a current location (e.g., within a sub-cell or other area defined based on an objective or subjective reference frame) and a set of factors relating to predicted and/or expected operation of the vUE. For example, a vUE traveling at a higher speed may consider wireless devices (e.g., vUEs and/or UEs) within a larger area to be relevant than a vUE traveling at a lower speed. In some aspects, a vUE near a border between sub-cells or other defined area may consider vUEs associated with each of the bordering sub-cells to be relevant.

The vUE 604a, in some aspects, may determine, at 634, that the vUE 604a is leaving (or is expected to leave) a current area. For example, vUE 704a may determine that it is leaving the area identified as sub-cell 2. Based on determining that the vUE 604a (or 704a) is leaving the area, the vUE 604a (or 704a) may transmit, and the base station 602 (or RU 740) associated with the area that is being left (e.g., sub-cell 2) may receive, peer history information 636 regarding the set of relevant actors maintained at the vUE 604a (or 704a). In some aspects, the base station 602 (or RU 740) may identify an additional vUE (e.g., vUE 604c corresponding to vUE 704c of FIG. 7) entering the area (e.g., sub-cell 2) and, based on the identification, may transmit, and vUE 604c may receive, peer history information 638 based on the peer history information 636. For example, referring to FIG. 7, if the vUE 704b (corresponding to vUE 604b) is identified in the peer history information 636 as being a misinforming or disinforming (e.g., a rogue) actor, the vUE 704c (corresponding to vUE 604c) may terminate or refrain from initiating and/or accepting a V2V communication and/or connection with vUE 704b based on peer classification information received from the RU 740.

In some aspects, based on determining that the vUE 604a (or 704a) is leaving the area, the vUE 604a (or 704a) may transmit, and the vUE 604c (or vUE 704c) entering the area that is being left by the vUE 604a (e.g., sub-cell 2) may receive, peer history information 640 regarding the set of relevant actors maintained at the vUE 604a (or 704a). In some aspects, the transmission of the peer history information 640 may be based on a previous identification of the vUE 604c (or 704c) as a vUE entering the area (e.g., sub-cell 2) For example, referring to FIG. 7, if the vUE 704b (corresponding to vUE 604b) is identified in the peer history information 640 as being a misinforming or disinforming (e.g., a rogue) actor, the vUE 704c (corresponding to vUE 604c) may terminate or refrain from initiating and/or accepting a V2V communication and/or connection with vUE 704b based on peer classification information received from the vUE 704a.

In some aspects, peer history information may include one or more of raw data, ML-based feature extraction, non-ML-based compressed information based on one or more of historical location information, local peer classification information (e.g., information regarding a local determination of rogue statuses), device identifier, packet history, timestamps, and received data elements associated with the set of wireless devices in the area associated with the network device and the first wireless device. In some aspects, the peer history information 636, 638, and/or 640 may include summarized information or a report of salient features of recent communication from one or more of the relevant wireless devices.

In some aspects, diagram 700 illustrates a set of connections (e.g., connection 721 and connection 722) between the vUEs and the network (e.g., RU 740). Additionally, diagram 700 illustrates a set of connections (e.g., connection 731, connection 733, connection 735, a canceled connection 737, and a connection 739) between vUEs (e.g., vUEs 704a, 704b, 704c, 704d, or 704e). In some aspects, a V2V link between two vUEs implies that they are co-located at the given point in time. The co-location, in some aspects, may be associated with a correlation among the measurements and other data collected and transmitted by these co-located and connected vUEs. Further, given the smaller area of a local sub-cell, the co-location also suggests a benefit to retaining short-term history. For example, a vUE leaving a sub-cell, may choose to transmit its own determination of V2V-specific rogue statuses of other vUEs in the sub-cell to the central network entity as a short-term history as described above. The vUE leaving the sub-cell may also transmit a compressed set of extracted features representing the short-term packet history to the central network entity. In some aspects, transmitting the representative, extracted features of the packet history may have a smaller overhead than transmitting the packets in real-time and may benefit from a lack of time-sensitivity. The feature extraction, in some aspects, may relate only to some data features, such as, location, IDs, or timestamps. In some aspects, the feature extraction may be implemented using one or more of ML models provided by the central network entity, onboard ML models, or non-ML compression methods (e.g., hash tables or other data compression algorithms). To any vUE that is predicted to enter the sub-cell, the central network entity may transmit the V2V-specific rogue statuses and packet histories of vUEs currently remaining in the sub-cell. In the intervening time, the central network entity may amend the list of available V2V-specific rogue statuses and the compressed feature extractions of packet histories based on one or more of a vUE leaving a sub-cell, or vUEs whose V2V-specific rogue statuses were included in the list of available V2V-specific rogue statuses and the compressed feature extractions of packet histories leave the sub-cell.

Figure 8:
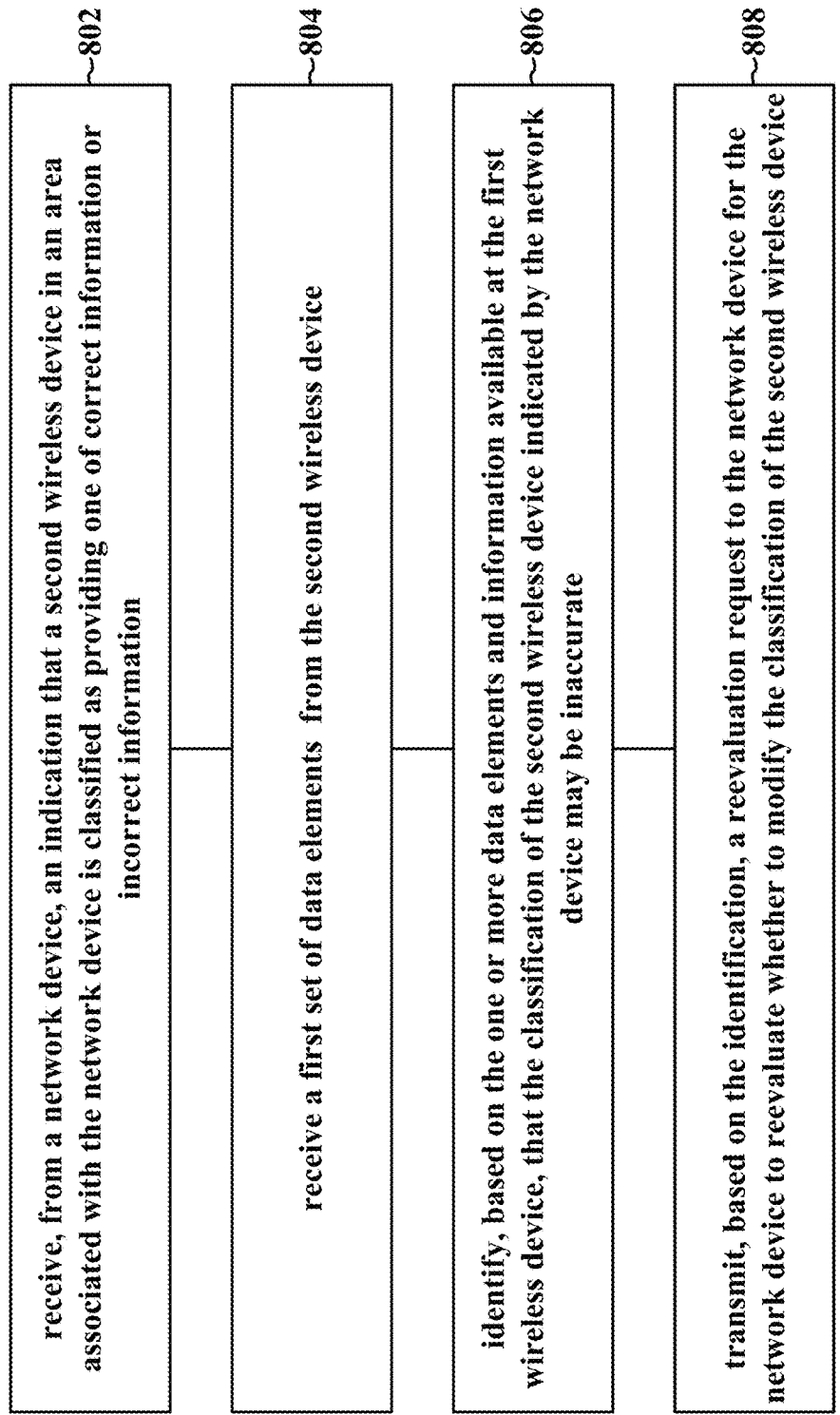
FIG. 8 is a flowchart of a method of wireless communication in accordance with some aspects of the disclosure.

FIG. 8 is a flowchart 800 of a method of wireless communication in accordance with some aspects of the disclosure. The method may be performed by a first wireless device such as a UE or a vUE (e.g., the UE 104, the vUE 404a, 404c, 504a, 504c, 604a, 704a; the apparatus 1304). At 802, the first wireless device may receive a first indication that a second wireless device associated with the first wireless device and a network device is classified as providing data of a first type. In some aspects, the first indication may be received from the network device. For example, 802 may be performed by application processor 1306, cellular baseband processor 1324, transceiver(s) 1322, antenna(s) 1380, or M/D-M component 198 of FIG. 13. In some aspects, the second wireless device is classified as providing data of the first type by one of the network device or a service entity associated with the network device. The first indication, in some aspects, may be included in an indication of a classification of a type of data provided by each of a plurality of (wireless) devices in a geographic area associated with the network device and the first wireless device. In some aspects, the indication may be based on an AI/ML operation for detecting misinforming and/or disinforming actors and the indication may include an identification of a type of inaccuracy (e.g., misinformation, disinformation, etc.) associated with the incorrect information as described above. For example, referring to FIGS. 4-7, the vUE 404a, 504a, 604a may receive, and RU 440 or 540, or base station 602 may transmit, classification information 606A including classification information for a set of vUEs in a first area (e.g., sub-cell 2 of FIG. 7) associated with the first wireless device (e.g., vUE 604a) and a network device (e.g., base station 602, or RU 440, 540, or 740). In some aspects, the classification may be made by one or more network service entities 450 or 550 associated with RU 440 or 540 (e.g., a network device or network device component).

At 804, the first wireless device may receive a first set of data elements from the second wireless device. For example, 804 may be performed by application processor 1306, cellular baseband processor 1324, transceiver(s) 1322, antenna(s) 1380, or M/D-M component 198 of FIG. 13. The first set of data elements, in some aspects, may be received directly from the second wireless device (e.g., as part of a V2V communication between the first wireless device and the second wireless device). The first set of data elements (or the V2V communication), in some aspects, may be associated with one or more of a sensor sharing operation, BSMs, ADASs, maneuvering messages, platooning (e.g., vehicle-to-platoon-lead) communication, and/or a perceptive wireless communication. For example, referring to FIGS. 4-6, the vUE 404a, 504a, or 604a, may receive from vUE 404c, 504c, or 604b, data 408, maneuver message 508, or data elements 610, respectively.

At 806, the first wireless device may identify, based on the first set of data elements received (e.g., at 804) from the second wireless device and a second set of data elements available at the first wireless device, that the classification of the second wireless device (e.g., the classification received at 802) may be inaccurate. For example, 806 may be performed by application processor 1306 or M/D-M component 198 of FIG. 13. The second set of data elements available at the first wireless device, in some aspects, may include one of internal information (e.g., images, radar point clouds, velocity, or other local data) collected by one or more sensors of the first wireless device or external information provided by one or more additional wireless devices. In some aspects, the second wireless device may be classified as providing incorrect information and the second set of data elements available at the first wireless device may include first information that may be used to correct the incorrect information provided by the second wireless device. The second wireless device, in some aspects, may be classified as providing correct information and the second set of data elements available at the first wireless device may include second information that is inconsistent with the one or more data elements. For example, referring to FIG. 4 or 6, the vUE 404a or 604a may identify at 612 that an indication that a vUE 404c or 604b is classified as a misinforming rogue actor (as providing incorrect and/or misleading information) may be inaccurate based on data 408 or data elements 610 and locally available data as described above. Alternatively, or additionally, referring to FIG. 5 or 6, the vUE 504a or 604a may identify at 612 that an indication that a vUE 504c or 604b is classified as an honest actor (as providing correct information) may be inaccurate based on maneuver message 508 or data elements 610 indicating an action that is not consistent with local sensor data (e.g., no reduction in speed is detected by local sensors despite a "braking" maneuver message 508).

At 808, the first wireless device may transmit, based on the identification that the classification of the second wireless device may be inaccurate, at least one of a second indication for the second wireless device to transmit a re-evaluation request or a third indication to the second wireless device to terminate a communication session with the first wireless device. For example, 808 may be performed by application processor 1306, cellular baseband processor 1324, transceiver(s) 1322, antenna(s) 1380, or M/D-M component 198 of FIG. 13. In some aspects, the second indication for the second wireless device to transmit the re-evaluation request further includes an indication for the second wireless device to transmit the re-evaluation request to one of the network device or the service entity that classified the second wireless device as providing data of the first type. The second indication regarding the re-evaluation request, in some aspects, may include information regarding the data available at the first wireless device that is the basis of the second indication transmitted at 808. In some aspects, the re-evaluation request may be related to specific contexts for which data from actors classified as providing incorrect and/or misleading data may be used or for which the data from actors classified as providing correct data is not to be used. For example, referring to FIGS. 4-6, the vUE 404*a*, 504*a*, or 604*a* may transmit a second indication 618 indicating for the vUE 604*b* to transmit re-evaluation request 620 based on the identification at 612.

In some aspects, the third indication to terminate a communication session with the first wireless device may be based on identifying that a classification of the second wireless device as an honest actor is, or is likely to be, inaccurate. For example, the first wireless device may determine that data elements and/or information regarding a position and/or maneuver associated with the second wireless device (or other devices) transmitted by the second wireless device is inconsistent and/or contradicts data collected from local sensors of the first wireless device or from trusted devices. In some aspects, determining that the information is inconsistent and/or contradictory may cause the first wireless device to locally classify the second wireless device as a disinforming and/or misinforming rogue actor. The first wireless device, in some aspects may then transmit the third indication based on a known or configured procedure for handling disinforming and/or misinforming rogue actors. For example, referring to FIGS. 4-6, the vUE 404*a*, 504*a*, or 604*a* may transmit a third indication 614 indicating for the vUE 604*b* to terminate a communication session with the first wireless device at 616A and/or 616B based on the identification at 612.

Figure 9:
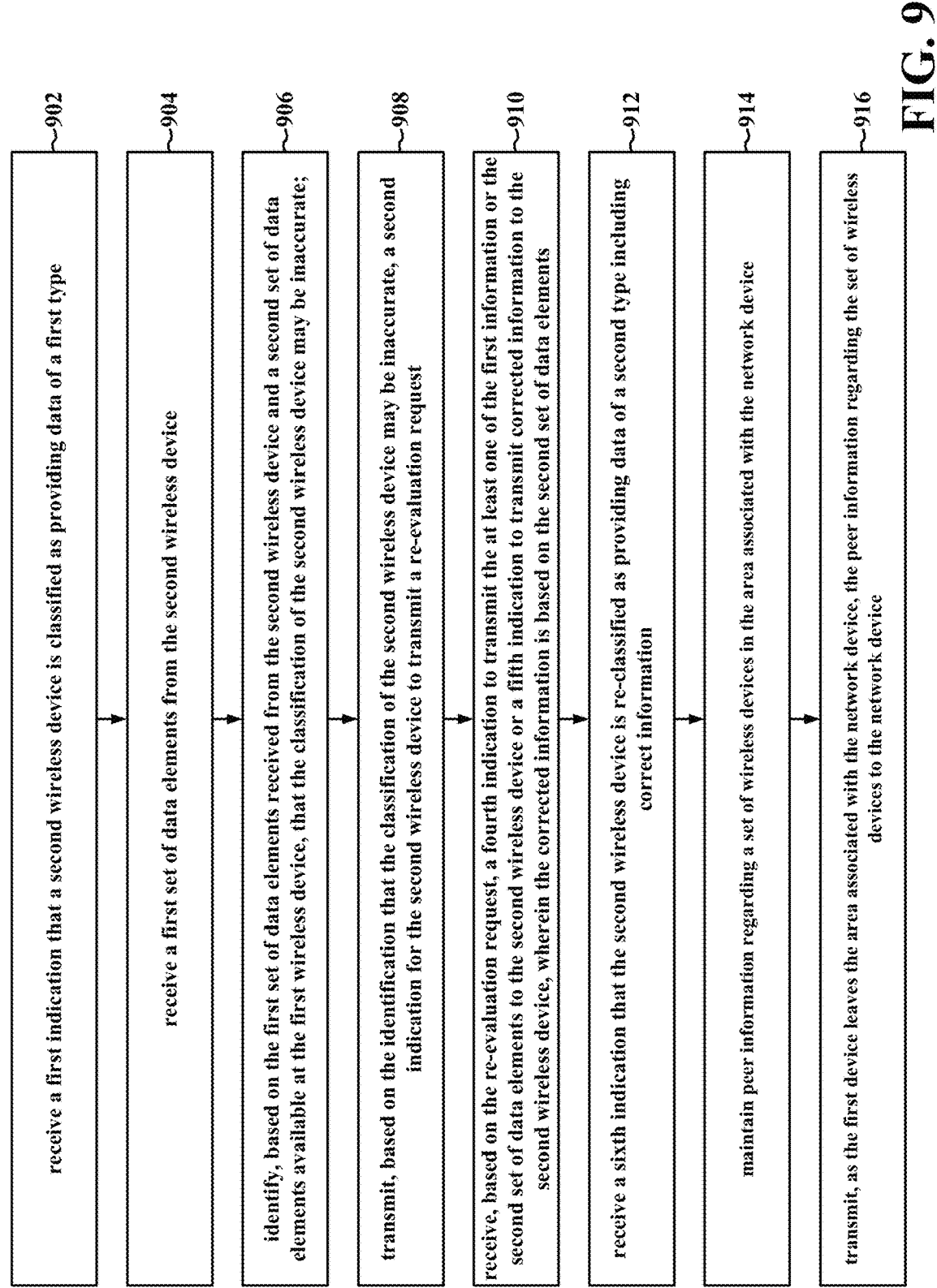
FIG. 9 is a flowchart of a method of wireless communication.

FIG. 9 is a flowchart 900 of a method of wireless communication in accordance with some aspects of the disclosure. The method may be performed by a first wireless device such as a UE or a vUE (e.g., the UE 104, the vUE 404*a*, 404*c*, 504*a*, 504*c*, 604*a*, 704*a*; the apparatus 1304). At 902, the first wireless device may receive a first indication that a second wireless device associated with the first wireless device and a network device is classified as providing data of a first type. In some aspects, the first indication may be received from the network device. For example, 902 may be performed by application processor 1306, cellular baseband processor 1324, transceiver(s) 1322, antenna(s) 1380, or M/D-M component 198 of FIG. 13. In some aspects, the second wireless device is classified as providing data of the first type by one of the network device or a service entity associated with the network device. The first indication, in some aspects, may be included in an indication of a classification of a type of data provided by each of a plurality of (wireless) devices in a geographic area associated with the network device and the first wireless device. In some aspects, the indication may be based on an AI/ML operation for detecting misinforming and/or disinforming actors and the indication may include an identification of a type of inaccuracy (e.g., misinformation, disinformation, etc.) associated with the incorrect information as described above. For example, referring to FIGS. 4-7, the vUE 404*a*, 504*a*, 604*a* may receive, and RU 440 or 540, or base station 602 may transmit, classification information 606A including classification information for a set of vUEs in a first area (e.g., sub-cell 2 of FIG. 7) associated with the first wireless device (e.g., vUE 604*a*) and a network device (e.g., base station 602, or RU 440, 540, or 740). In some aspects, the classification may be made by one or more network service entities 450 or 550 associated with RU 440 or 540 (e.g., a network device or network device component).

At 904, the first wireless device may receive a first set of data elements from the second wireless device. For example, 904 may be performed by application processor 1306, cellular baseband processor 1324, transceiver(s) 1322, antenna(s) 1380, or M/D-M component 198 of FIG. 13. The first set of data elements, in some aspects, may be received directly from the second wireless device (e.g., as part of a V2V communication between the first wireless device and the second wireless device). The first set of data elements (or the V2V communication), in some aspects, may be associated with one or more of a sensor sharing operation, BSMs, ADASs, maneuvering messages, platooning (e.g., vehicle-to-platoon-lead) communication, and/or a perceptive wireless communication. For example, referring to FIGS. 4-6, the vUE 404*a*, 504*a*, or 604*a*, may receive from vUE 404*c*, 504*c*, or 604*b*, data 408, maneuver message 508, or data elements 610, respectively.

At 906, the first wireless device may identify, based on the first set of data elements received (e.g., at 904) from the second wireless device and a second set of data elements available at the first wireless device, that the classification of the second wireless device (e.g., the classification received at 902) may be inaccurate. For example, 906 may be performed by application processor 1306 or M/D-M component 198 of FIG. 13. The second set of data elements available at the first wireless device, in some aspects, may include one of internal information (e.g., images, radar point clouds, velocity, or other local data) collected by one or more sensors of the first wireless device or external information provided by one or more additional wireless devices. In some aspects, the second wireless device may be classified as providing incorrect information and the second set of data elements available at the first wireless device may include first information that may be used to correct the incorrect information provided by the second wireless device. The second wireless device, in some aspects, may be classified as providing correct information and the second set of data elements available at the first wireless device may include second information that is inconsistent with the one or more data elements. For example, referring to FIG. 4 or 6, the vUE 404*a* or 604*a* may identify at 612 that an indication that a vUE 404*c* or 604*b* is classified as a misinforming rogue actor (as providing incorrect and/or misleading information) may be inaccurate based on data 408 or data elements 610 and locally available data as described above. Alternatively, or additionally, referring to FIG. 5 or 6, the vUE 504*a* or 604*a* may identify at 612 that an indication that a vUE 504*c* or 604*b* is classified as an honest actor (as providing correct information) may be inaccurate based on maneuver message 508 or data elements 610 indicating an action that is not consistent with local sensor data (e.g., no reduction in speed is detected by local sensors despite a "braking" maneuver message 508).

At 908, the first wireless device may transmit, based on the identification that the classification of the second wireless device may be inaccurate, a second indication for the second wireless device to transmit a re-evaluation request. For example, 908 may be performed by application processor 1306, cellular baseband processor 1324, transceiver(s) 1322, antenna(s) 1380, or M/D-M component 198 of FIG. 13. In some aspects, the second indication for the second wireless device to transmit the re-evaluation request further comprises an indication for the second wireless device to transmit the re-evaluation request to one of the network device or the service entity that classified the second wireless device as providing data of the first type. The second indication regarding the re-evaluation request, in some aspects, may include information regarding the data available at the first wireless device that is the basis of the second indication transmitted at 908. In some aspects, the re-evaluation request may be related to specific contexts for which data from actors classified as providing incorrect and/or misleading data may be used or for which the data from actors classified as providing correct data should not be used. For example, referring to FIGS. 4-6, the vUE 404a, 504a, or 604a may transmit a second indication 618 indicating for the vUE 604b to transmit re-evaluation request 620 based on the identification at 612.

At 910, the first wireless device may receive, based on the re-evaluation request, a fourth indication to transmit at least one of the first information or the second set of data elements to the second wireless device or, a fifth indication to transmit corrected information to the second wireless device. For example, 910 may be performed by application processor 1306, cellular baseband processor 1324, transceiver(s) 1322, antenna(s) 1380, or M/D-M component 198 of FIG. 13. In some aspects, the first information may be transmitted to the second wireless device for the second wireless device to correct information locally. The corrected information, in some aspects, may be generated by the first wireless device based on the second set of data elements and the first information. For example, referring to FIGS. 4-6, the vUE 404a, 504a, or 604a may receive fourth indication 624A or fifth indication 624B to transmit the first information or corrected information to the second wireless device (e.g., 404b, 504b, or 604b).

At 912, the first wireless device may receive a sixth indication that the second wireless device is re-classified as providing data of a second type comprising correct information. For example, 912 may be performed by application processor 1306, cellular baseband processor 1324, transceiver(s) 1322, antenna(s) 1380, or M/D-M component 198 of FIG. 13. The re-classification, in some aspects, may be received from the network device. In some aspects, the additional indication received at 912, in some aspects, may confirm the earlier classification, e.g., the re-classification may produce the same result as the original classification if the basis of the re-evaluation request is not sufficient to change the original classification. The operations at 902-912 (or 904-912) may be performed for additional wireless devices participating in a sensor sharing, perceptive wireless communication, BSM, and/or ADAS. For example, referring to FIGS. 4-6, the vUE 404a, 504a, or 604a may receive sixth indication 624C that the second wireless device (e.g., 404b, 504b, or 604b) is re-classified as providing data of a second type including correct information.

Based on the indication received at 902, and the re-classification received at 912, the first wireless device may maintain, at 914, independent peer history information regarding (e.g., corresponding to or associated with) a set of wireless devices in a geographic area currently associated with the network device and the first wireless device. For example, 914 may be performed by application processor 1306 or M/D-M component 198 of FIG. 13. The peer information regarding the set of wireless devices (e.g., UEs, vUEs, RUs, etc.), in some aspects, may be for a set of wireless devices that are identified as relevant actors for, or to, the first wireless device. For example, referring to FIGS. 6 and 7, the vUE 604a or 704a may maintain, at 632, classification information (peer information) for multiple wireless devices (e.g., UEs, vUEs, RUs, etc.) that are determined to be relevant to the vUE 604a or 704a (e.g., such as vUEs 704b and 704d in a same sub-cell 2 or other UEs and/or vUEs that may be in the sub-cell 2 or an adjacent sub-cell).

As discussed above, in some aspects, the relevant actors may include actors that have a non-negligible probability of interacting with the first wireless device during a preceding or a following time period (of a known or configured duration). The determination of the set of relevant actors, in some aspects, may be made by one or more of the first wireless device itself, a central network entity such as a base station or network service entity, a neighboring wireless device (provided that the neighboring vUE is permitted by the first vUE to determine and communicate lists of relevant actors). The relevant actors, in some aspects, may further be based on a current location (e.g., within a sub-cell or other area defined based on an objective or subjective reference frame) and a set of factors relating to predicted and/or expected operation of the first wireless device. For example, a wireless device traveling at a higher speed may consider wireless devices (e.g., vUEs and/or UEs) within a larger area to be relevant than would a wireless device traveling at a lower speed. In some aspects, a vUE near a border between sub-cells or other defined area may consider vUEs associated with each of the bordering sub-cells to be relevant.

Finally, at 916, the first wireless device may transmit additional information based on the independent peer history information to the network device. For example, 916 may be performed by application processor 1306, cellular baseband processor 1324, transceiver(s) 1322, antenna(s) 1380, or M/D-M component 198 of FIG. 13. In some aspects, the geographic area may be a geographic area associated with the first wireless device and the network device. In some aspects, the peer information may be transmitted to the network device at 916 as the first wireless device leaves the geographic area (or determines that it is likely to leave the geographic area). In some aspects, the peer information includes peer classification information for the set of wireless devices for each of a set of one or more different contexts (e.g., applications and/or services). In some aspects, the peer information may alternatively, or additionally, be transmitted to a third wireless via a (V2V) connection from the first wireless device or via a (V2I) connection from the network device. For example, referring to FIGS. 6 and 7, the vUE 604a or 704a, may transmit peer history information 636 and/or 640 to base station 602 (or RU 740) and/or to vUE 604c.

Figure 10:
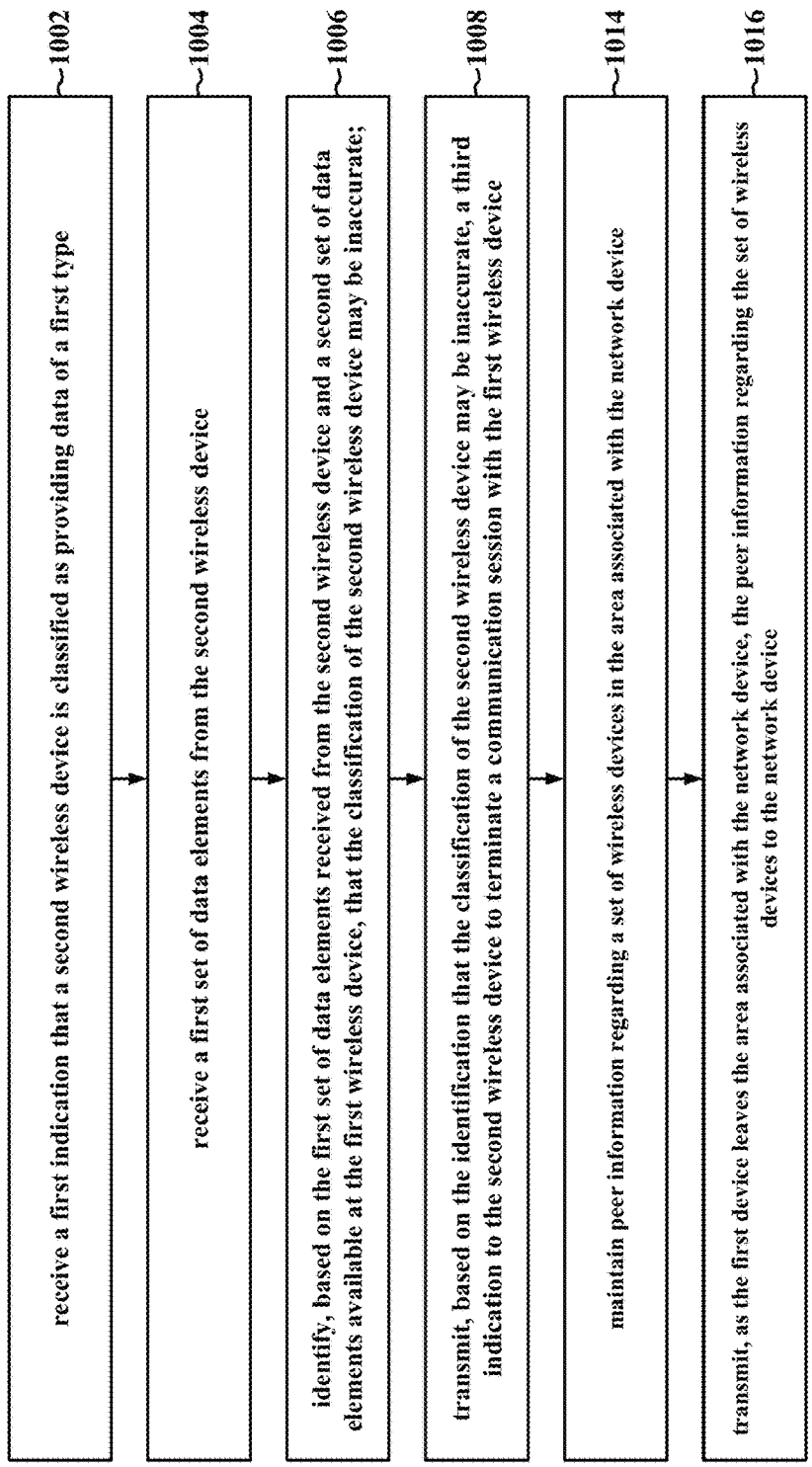
FIG. 10 is a flowchart of a method of wireless communication in accordance with some aspects of the disclosure.

FIG. 10 is a flowchart 1000 of a method of wireless communication in accordance with some aspects of the disclosure. The method may be performed by a first wireless device such as a UE or a vUE (e.g., the UE 104, the vUE 404a, 404c, 504a, 504c, 604a, 704a; the apparatus 1304). At 1002, the first wireless device may receive, from a network device, a first indication that a second wireless device associated with the network device and the first wireless device is classified as providing data of a first type. For example, 1002 may be performed by application processor 1306, cellular baseband processor 1324, transceiver(s) 1322, antenna(s) 1380, or M/D-M component 198 of FIG. 13. In some aspects, the second wireless device is classified as providing data of the first type by one of the network device or a service entity associated with the network device. The first indication, in some aspects, may be included in an indication of a classification of a type of data provided by each of a plurality of (wireless) devices in a geographic area associated with the network device and the first wireless device. In some aspects, the indication may be based on an AI/ML operation for detecting misinforming and/or disinforming actors and the indication may include an identification of a type of inaccuracy (e.g., misinformation, disinformation, etc.) associated with the incorrect information as described above. For example, referring to FIGS. 4-7, the vUE 404a, 504a, 604a may receive, and RU 440 or 540, or base station 602 may transmit, classification information 606A including classification information for a set of vUEs in a first area (e.g., sub-cell 2 of FIG. 7) associated with the first wireless device (e.g., vUE 604a) and a network device (e.g., base station 602, or RU 440, 540, or 740). In some aspects, the classification may be made by one or more network service entities 450 or 550 associated with RU 440 or 540 (e.g., a network device or network device component).

At 1004, the first wireless device may receive a first set of data elements from the second wireless device. For example, 1004 may be performed by application processor 1306, cellular baseband processor 1324, transceiver(s) 1322, antenna(s) 1380, or M/D-M component 198 of FIG. 13. The first set of data elements, in some aspects, may be received directly from the second wireless device (e.g., as part of a V2V communication between the first wireless device and the second wireless device). The first set of data elements (or the V2V communication), in some aspects, may be associated with one or more of a sensor sharing operation, BSMs, ADASs, maneuvering messages, platooning (e.g., vehicle-to-platoon-lead) communication, and/or a perceptive wireless communication. For example, referring to FIGS. 4-6, the vUE 404a, 504a, or 604a, may receive from vUE 404c, 504c, or 604b, data 408, maneuver message 508, or data elements 610, respectively.

At 1006, the first wireless device may identify, based on the first set of data elements received (e.g., at 1004) from the second wireless device and a second set of data elements available at the first wireless device, that the classification of the second wireless device (e.g., the classification received at 1002) may be inaccurate. For example, 1006 may be performed by application processor 1306 or M/D-M component 198 of FIG. 13. The second set of data elements available at the first wireless device, in some aspects, may include one of internal information (e.g., images, radar point clouds, velocity, or other local data) collected by one or more sensors of the first wireless device or external information provided by one or more additional wireless devices. In some aspects, the second wireless device may be classified as providing incorrect information and the second set of data elements available at the first wireless device may include first information that may be used to correct the incorrect information provided by the second wireless device. The second wireless device, in some aspects, may be classified as providing correct information and the second set of data elements available at the first wireless device may include second information that is inconsistent with the one or more data elements. For example, referring to FIG. 4 or 6, the vUE 404a or 604a may identify at 612 that an indication that a vUE 404c or 604b is classified as a misinforming rogue actor (as providing incorrect and/or misleading information) may be inaccurate based on data 408 or data elements 610 and locally available data as described above. Alternatively, or additionally, referring to FIG. 5 or 6, the vUE 504a or 604a may identify at 612 that an indication that a vUE 504c or 604b is classified as an honest actor (as providing correct information) may be inaccurate based on maneuver message 508 or data elements 610 indicating an action that is not consistent with local sensor data (e.g., no reduction in speed is detected by local sensors despite a "braking" maneuver message 508).

At 1008, the first wireless device may transmit, based on the identification that the classification of the second wireless device may be inaccurate, a third indication to the second wireless device to terminate a communication session with the first wireless device. For example, 1008 may be performed by application processor 1306, cellular baseband processor 1324, transceiver(s) 1322, antenna(s) 1380, or M/D-M component 198 of FIG. 13. In some aspects, the third indication to terminate the communication session with the first wireless device may be based on identifying that a classification of the second wireless device as an honest actor is, or is likely to be, inaccurate. For example, the first wireless device may determine that data elements and/or information regarding a position and/or maneuver associated with the second wireless device (or other devices) transmitted by the second wireless device is inconsistent and/or contradicts data collected from local sensors of the first wireless device or from trusted devices. In some aspects, determining that the information is inconsistent and/or contradictory may cause the first wireless device to locally classify the second wireless device as a disinforming and/or misinforming rogue actor. The first wireless device, in some aspects may then transmit the third indication based on a known or configured procedure for handling disinforming and/or misinforming rogue actors. For example, referring to FIGS. 4-6, the vUE 404a, 504a, or 604a may transmit a third indication 614 indicating for the vUE 604b to terminate a communication session with the first wireless device at 616A and/or 616B based on the identification at 612.

Based on the indication received at 1002, and the identification at 1006, the first wireless device may maintain, at 1014, independent peer history information regarding (e.g., corresponding to or associated with) a set of wireless devices in a geographic area currently associated with the network device and the first wireless device. For example, 1014 may be performed by application processor 1306 or M/D-M component 198 of FIG. 13. The peer information regarding the set of wireless devices (e.g., UEs, vUEs, RUs, etc.), in some aspects, may be for a set of wireless devices that are identified as relevant actors for, or to, the first wireless device. For example, referring to FIGS. 6 and 7, the vUE 604a or 704a may maintain, at 632, classification information (peer information) for multiple wireless devices (e.g., UEs, vUEs, RUs, etc.) that are determined to be relevant to the vUE 604a or 704a (e.g., such as vUEs 704b and 704d in a same sub-cell 2 or other UEs and/or vUEs that may be in the sub-cell 2 or an adjacent sub-cell).

As discussed above, in some aspects, the relevant actors may include actors that have a non-negligible probability of interacting with the first wireless device during a preceding or a following time period (of a known or configured duration). The determination of the set of relevant actors, in some aspects, may be made by one or more of the first wireless device itself, a central network entity such as a base station or network service entity, a neighboring wireless device (provided that the neighboring vUE is permitted by the first vUE to determine and communicate lists of relevant actors). The relevant actors, in some aspects, may further be based on a current location (e.g., within a sub-cell or other area defined based on an objective or subjective reference frame) and a set of factors relating to predicted and/or expected operation of the first wireless device. For example, a wireless device traveling at a higher speed may consider wireless devices (e.g., vUEs and/or UEs) within a larger area to be relevant than would a wireless device traveling at a lower speed. In some aspects, a vUE near a border between sub-cells or other defined area may consider vUEs associated with each of the bordering sub-cells to be relevant.

Finally, at 1016, the first wireless device may transmit additional information based on the independent peer information history to the network device. For example, 1016 may be performed by application processor 1306, cellular baseband processor 1324, transceiver(s) 1322, antenna(s) 1380, or M/D-M component 198 of FIG. 13. In some aspects, the geographic area may be a geographic area associated with the first wireless device and the network device. In some aspects, the peer information may be transmitted to the network device at 1016 as the first wireless device leaves the geographic area (or determines that it is likely to leave the geographic area). In some aspects, the peer information includes peer classification information for the set of wireless devices for each of a set of one or more different contexts (e.g., applications and/or services). In some aspects, the peer information may alternatively, or additionally, be transmitted to a third wireless via a (V2V) connection from the first wireless device or via a (V2I) connection from the network device. For example, referring to FIGS. 6 and 7, the vUE 604a or 704a, may transmit peer history information 636 and/or 640 to base station 602 (or RU 740) and/or to vUE 604c.

Figure 11:
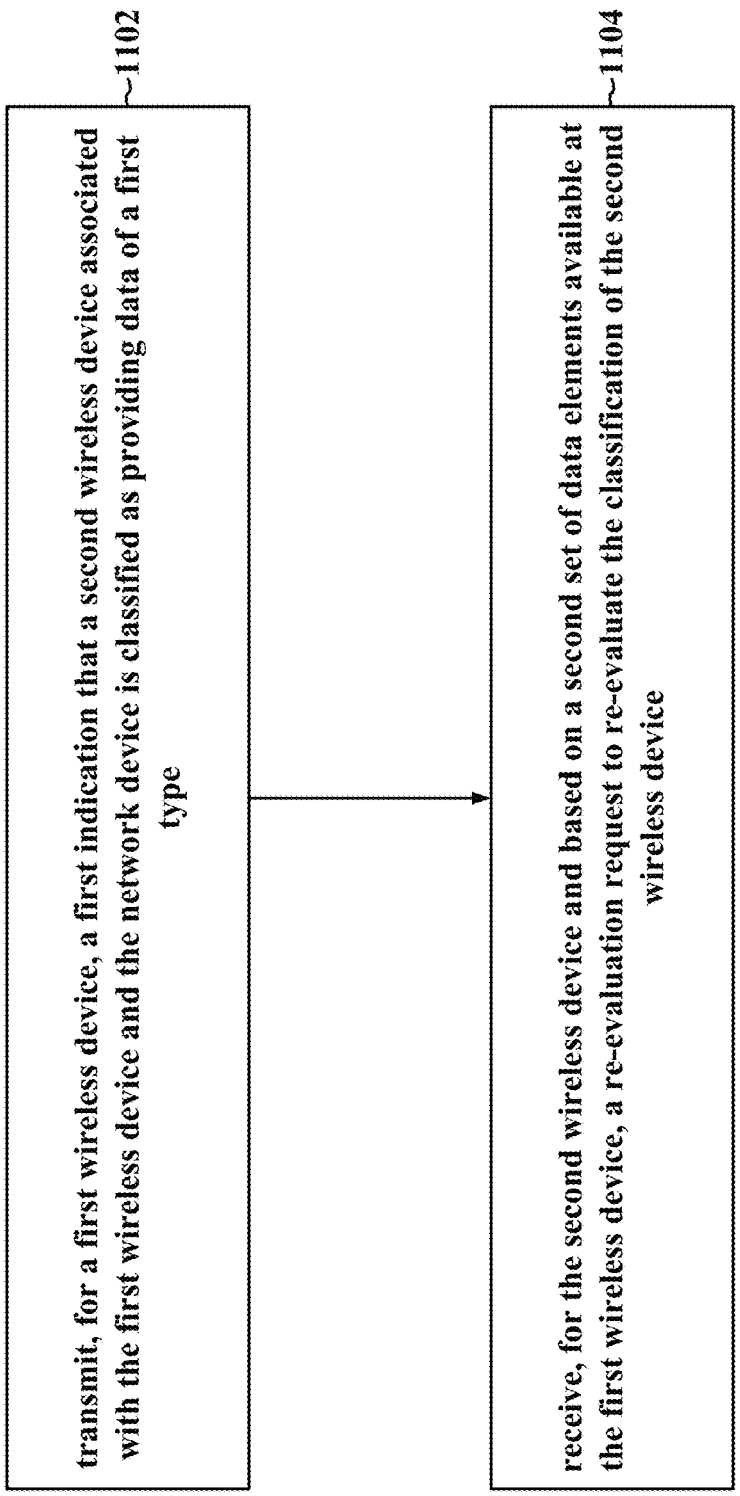
FIG. 11 is a flowchart of a method of wireless communication.

FIG. 11 is a flowchart 1100 of a method of wireless communication. The method may be performed by a network device (e.g., such as a base station or other network device component) (e.g., the base station 102 or 602, the RU 440, 540, or 740; the network entity 1402). At 1102, the network device may transmit, for a first wireless device, a first indication that a second wireless device associated with the first wireless device and the network device is classified as providing data of a first type. For example, 1102 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. In some aspects, the second wireless device may be classified as providing data of the first type by one of the network device or a service entity associated with the network device. For example, referring to FIGS. 4-6, the RU 440, the RU 540, and/or the base station 602 may transmit, and vUE 404a, 504a, or 604a may receive, classification information 606A indicating that the vUE 604b (corresponding to vUE 404c or 504c) is classified as providing data of a first type.

At 1104, the network device may receive, for the second wireless device, a re-evaluation request to re-evaluate the classification of the second wireless device. For example, 1104 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. In some aspects, the request for re-evaluation may be received based on a second indication, from the first wireless device to the second wireless device, for the second wireless device to transmit a re-evaluation request. The second indication, in some aspects, may be based on a second set of data elements available at the first wireless device that may be used to correct information included in the first set of data elements. For example, referring to FIGS. 4-6, the RU 440, the RU 540, or the base station 602 may receive re-evaluation request 620 from vUE 404c, 504c, or 604b.

Figure 12:
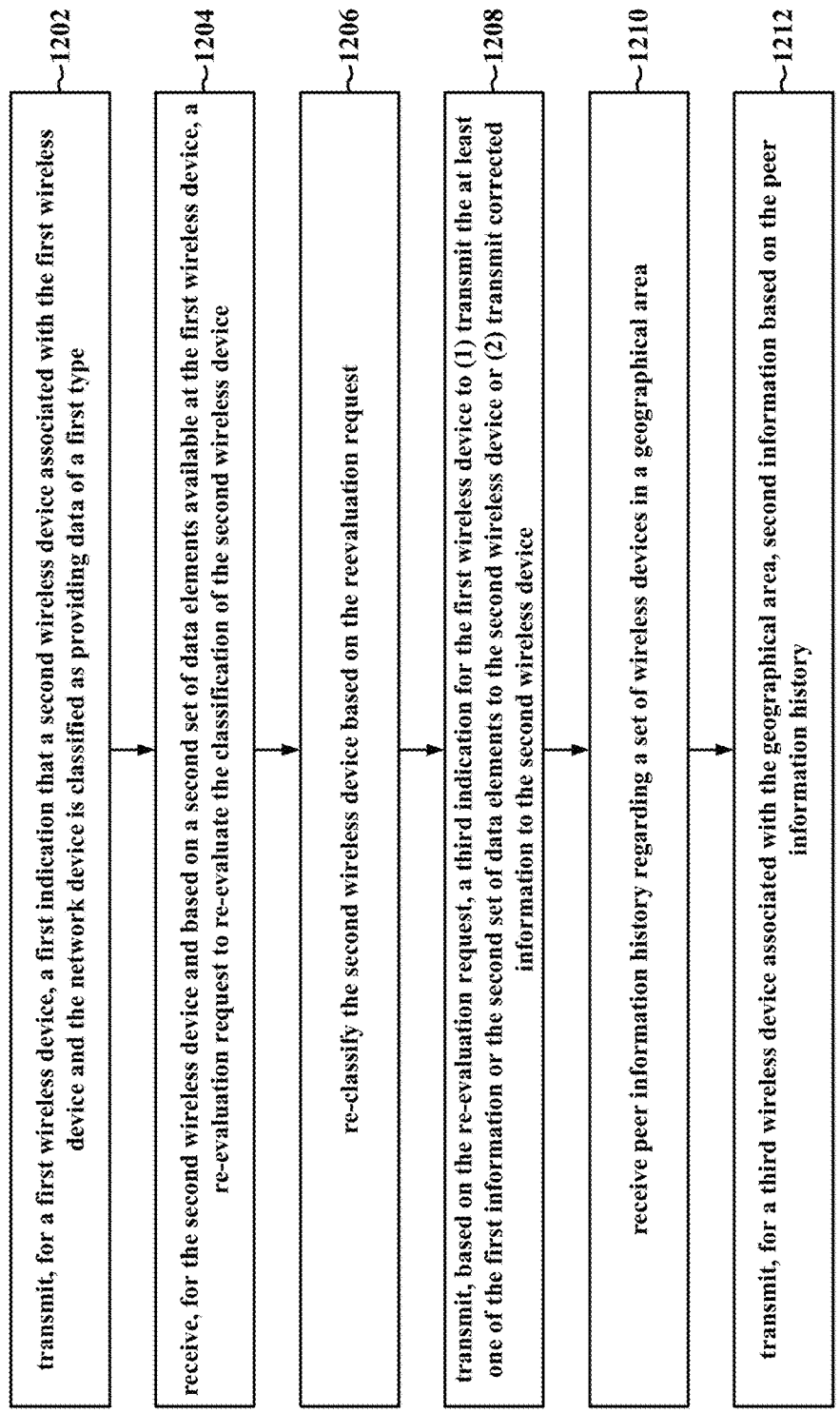
FIG. 12 is a flowchart of a method of wireless communication.

FIG. 12 is a flowchart 1200 of a method of wireless communication. The method may be performed by a network device (e.g., such as a base station or other network device component) (e.g., the base station 102 or 602, the RU 440, 540, or 740; the network entity 1402). At 1202, the network device may transmit, for a first wireless device, a first indication that a second wireless device associated with the first wireless device and the network device is classified as providing data of a first type. For example, 1202 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. In some aspects, the second wireless device may be classified as providing data of the first type by one of the network device or a service entity associated with the network device. In some aspects, the first indication may be included in a plurality of indications of classifications of types of data provided by each of a corresponding plurality of wireless devices. The plurality of wireless devices, in some aspects, may include a plurality of wireless devices in a geographic area associated with the network device and the first wireless device. For example, referring to FIGS. 4-6, the RU 440, the RU 540, and/or the base station 602 may transmit, and vUE 404a, 504a, or 604a may receive, classification information 606A indicating that the vUE 604b (corresponding to vUE 404c or 504c) is classified as providing data of a first type.

At 1204, the network device may receive, for the second wireless device, a re-evaluation request to re-evaluate the classification of the second wireless device. For example, 1204 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. In some aspects, the request for re-evaluation may be received based on a second indication, from the first wireless device to the second wireless device, for the second wireless device to transmit a re-evaluation request. The second indication, in some aspects, may be based on a second set of data elements available at the first wireless device that may be used to correct information included in the first set of data elements. For example, referring to FIGS. 4-6, the RU 440, the RU 540, or the base station 602 may receive re-evaluation request 620 from vUE 404c, 504c, or 604b.

At 1206, the network device may re-classify the second wireless device based on the re-evaluation request. For example, 1206 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. In some aspects, the re-evaluation of the second wireless device, may be different from the original classification included in the first indication for at least one context (e.g., a classification associated with one type of data and/or one service entity). For example, referring to FIGS. 4-6, the RU 440, the RU 540, or the base station 602, may re-classify (or re-evaluate) at 622 the second wireless device as providing one of the first or second types of data based on the re-evaluation request 620.

At 1208, the network device may transmit, based on the re-evaluation request, a third indication for the first wireless device to (1) transmit at least one of the first information or the second set of data elements to the second wireless device or (2) transmit corrected information to the second wireless device. For example, 1208 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The content of the third indication, in some aspects, may be configured to be one of an indication for the first wireless device to transmit at least one of the first information or the second set of data elements or the corrected information when a second wireless device is re-classified from a wireless device providing a first type of incorrect information to a wireless device providing a second type of correct information. In some aspects, the content of the third indication may be based on a context for which the information is classified and/or identified as being incorrect or the type of information that is classified and/or identified as being incorrect. For example, referring to FIGS. 4-6, the RU 440, the RU 540, or the base station 602, may transmit, and the vUE 604a may receive, the fourth indication 624A for the vUE 604a to transmit the information available at the vUE 604a to the vUE 604b for the vUE 604b to correct the incorrect information or the fifth indication 624B indicating for the vUE 604a to transmit corrected information to the second wireless device.

Based on the indication transmitted at 1202, the network device may receive, at 1210, peer information history regarding (e.g., corresponding to or associated with) a set of wireless devices in a geographic area currently associated with the network device and the first wireless device. For example, 1210 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. The peer information regarding the set of wireless devices (e.g., UEs, vUEs, RUs, etc.), in some aspects, may be for a set of wireless devices that are identified as relevant actors for, or to, the first wireless device. In some aspects, the peer information history may be transmitted to the network device by the first wireless device as the first wireless device leaves the geographic area (or determines that it is likely to leave the geographic area). In some aspects, the peer information includes peer classification information for the set of wireless devices for each of a set of one or more different contexts (e.g., applications and/or services). For example, referring to FIGS. 6 and 7, the base station 602 and/or the RU 740 may receive peer history information 636 from vUE 604a or 704a for multiple wireless devices (e.g., UEs, vUEs, RUs, etc.) that are determined to be relevant to the vUE 604a or 704a (e.g., such as vUEs 704b and 704d in a same sub-cell 2 or other UEs and/or vUEs that may be in the sub-cell 2 or an adjacent sub-cell).

As discussed above, in some aspects, the relevant actors may include actors that have a non-negligible probability of interacting with the first wireless device during a preceding or a following time period (of a known or configured duration). The determination of the set of relevant actors, in some aspects, may be made by one or more of the first wireless device itself, a central network entity such as a base station or network service entity, a neighboring wireless device (provided that the neighboring vUE is permitted by the first vUE to determine and communicate lists of relevant actors). The relevant actors, in some aspects, may further be based on a current location (e.g., within a sub-cell or other area defined based on an objective or subjective reference frame) and a set of factors relating to predicted and/or expected operation of the first wireless device. For example, a wireless device traveling at a higher speed may consider wireless devices (e.g., vUEs and/or UEs) within a larger area to be relevant than would a wireless device traveling at a lower speed. In some aspects, a vUE near a border between sub-cells or other defined area may consider vUEs associated with each of the bordering sub-cells to be relevant.

Finally, at 1212, the network device may transmit for a third wireless device associated with the geographic area, second information based on the peer information history. For example, 1212 may be performed by CU processor 1412, DU processor 1432, RU processor 1442, transceiver(s) 1446, antenna(s) 1480, network interface 1580, network processor 1512, or misinformation mitigation component 199 of FIG. 14 or 15. In some aspects, the geographic area may be a geographic area associated with the third wireless device and the network device. In some aspects, the peer information may be transmitted to the third wireless via a V2I connection from the network device. For example, referring to FIGS. 6 and 7, the base station 602 or the RU 740, may transmit peer history information 638 to vUE 604c.

Figure 13:
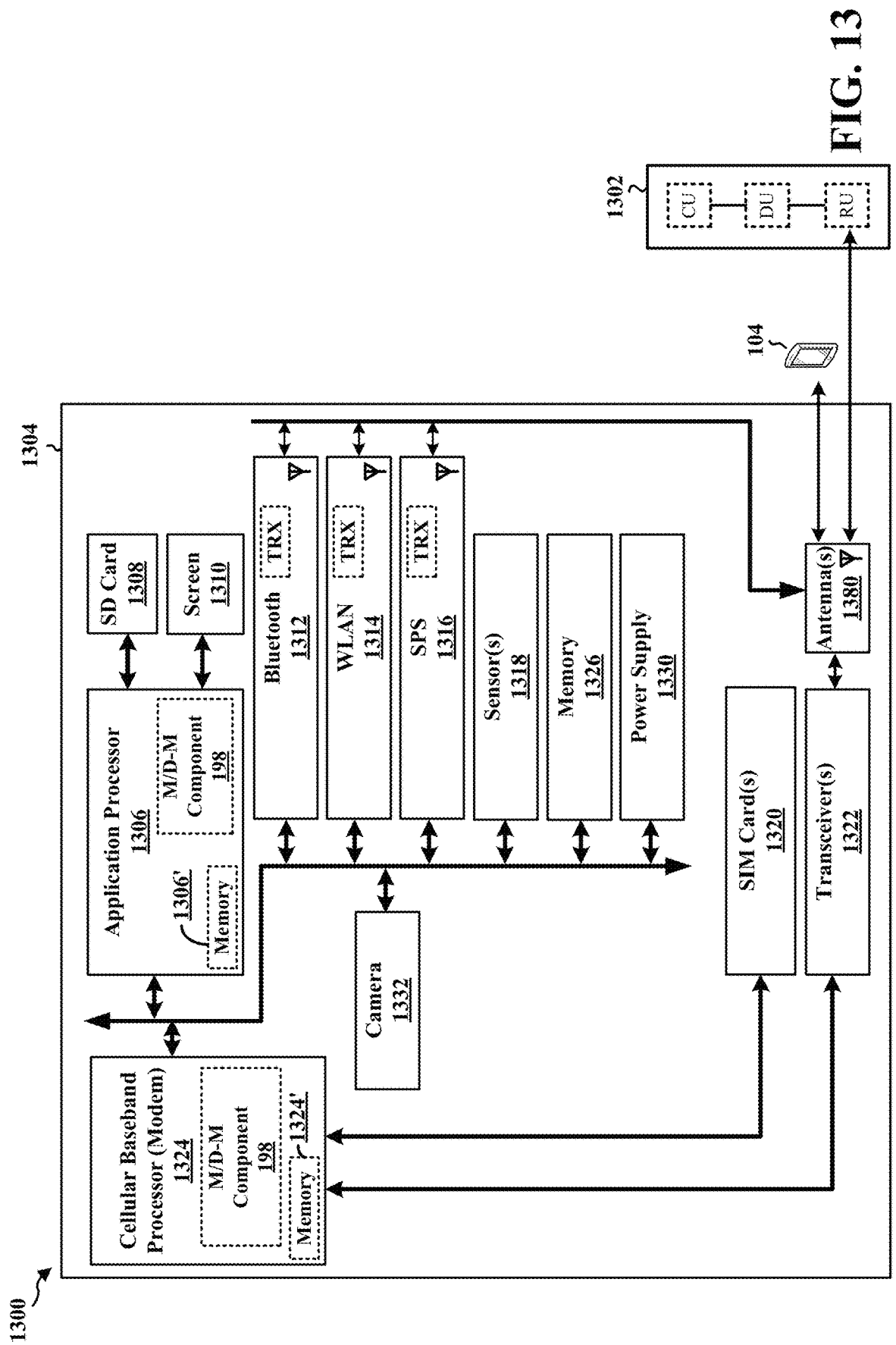
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/ memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see UE 350 of FIG. 3) and include the additional modules of the apparatus 1304.

As discussed supra, the M/D-M component 198 may be configured to receive, from a network device, a first indication that a second wireless device associated with the first wireless device and the network device is classified as providing data of a first type. The M/D-M component 198 may also be configured to receive a first set of data elements from the second wireless device. The M/D-M component 198 may be configured to identify, based on the first set of data elements received from the second wireless device and a second set of data elements available at the first wireless device, that the classification of the second wireless device may be inaccurate. The M/D-M component 198 may be configured to transmit, based on the identification that the classification of the second wireless device may be inaccurate, at least one of a second indication for the second wireless device to transmit a re-evaluation request or a third indication to the second wireless device to terminate a communication session with the first wireless device. The M/D-M component 198 may be within the cellular baseband processor 1324, the application processor 1306, or both the cellular baseband processor 1324 and the application processor 1306. The M/D-M component 198 may be one or more hardware components specifically configured to carry out the stated processes/algorithm, implemented by one or more processors configured to perform the stated processes/ algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for receiving, from a network device, a first indication that a second wireless device associated with the first wireless device and the network device is classified as providing data of a first type. The apparatus 1304, and in particular the cellular baseband processor 1324 and/or the application processor 1306, in some aspects, may include means for receiving a first set of data elements from the second wireless device. The apparatus 1304, and in particular the cellular baseband processor 1324 and/or the application processor 1306, in some aspects, may include means for identifying, based on the first set of data elements received from the second wireless device and a second set of data elements available at the first wireless device, that the classification of the second wireless device may be inaccurate. The apparatus 1304, and in particular the cellular baseband processor 1324 and/or the application processor 1306, in some aspects, may include means for transmitting, based on the identification that the classification of the second wireless device may be inaccurate, at least one of a second indication for the second wireless device to transmit a re-evaluation request or a third indication to the second wireless device to terminate a communication session with the first wireless device. The apparatus 1304, and in particular the cellular baseband processor 1324 and/or the application processor 1306, in some aspects, may include means for receiving the first set of data elements from the second wireless device as part of a vehicle-to-vehicle communication between the first wireless device and the second wireless device associated with one or more of sensor sharing, BSM, or maneuvering messages. The apparatus 1304, and in particular the cellular baseband processor 1324 and/or the application processor 1306, in some aspects, may include means for receiving, based on the re-evaluation request, a fourth indication to transmit at least one of the first information or the second set of data elements to the second wireless device. The apparatus 1304, and in particular the cellular baseband processor 1324 and/or the application processor 1306, in some aspects, may include means for receiving, based on the re-evaluation request, a fifth indication to (1) transmit corrected information to the second wireless device, wherein the corrected information is based on the second set of data elements. The apparatus 1304, and in particular the cellular baseband processor 1324 and/or the application processor 1306, in some aspects, may include means for receiving a sixth indication that the second wireless device is re-classified as providing data of a second type comprising correct information. The apparatus 1304, and in particular the cellular baseband processor 1324 and/or the application processor 1306, in some aspects, may include means for maintaining independent peer history information regarding a set of wireless devices in a geographic area currently associated with the network device and the first wireless device. The apparatus 1304, and in particular the cellular baseband processor 1324 and/or the application processor 1306, in some aspects, may include means for transmitting additional information based on the independent peer history information to the network device. The means may be the M/D-M component 198 of the apparatus 1304 configured to perform the functions recited by the means or described in relation to any of the flowcharts of FIGS. 8-10. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
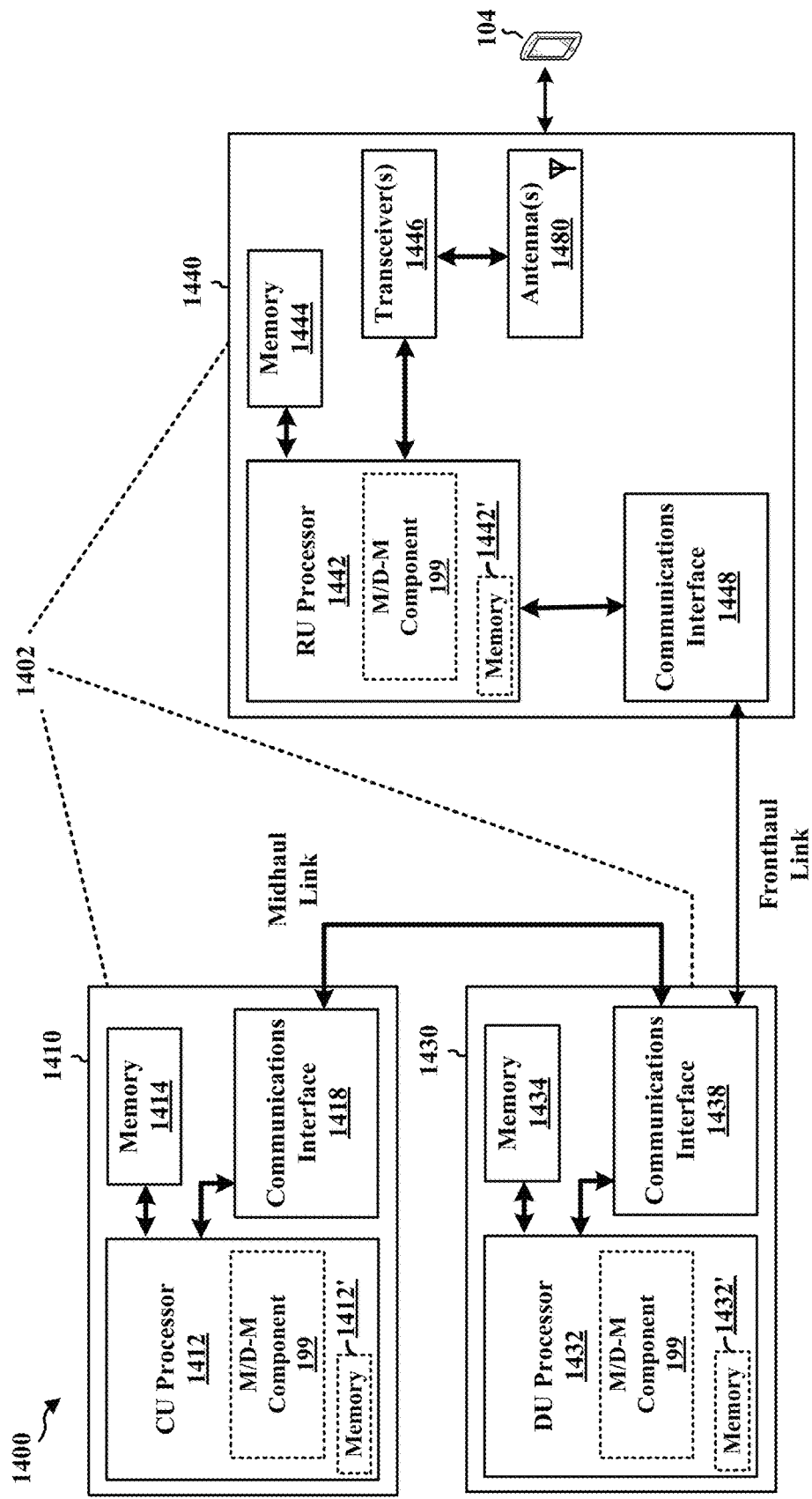
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU

1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the M/D-M component 199 may be configured to transmit, for a first wireless device, a first indication that a second wireless device associated with the first wireless device and the network device is classified as providing data of a first type. The M/D-M component 199 may further be configured to receive, for the second wireless device and based on a second set of data elements available at the first wireless device, a re-evaluation request to re-evaluate the classification of the second wireless device. The M/D-M component 199 may be within one or more processors of one or more of the CU 1410, DU 1430, and the RU 1440. The M/D-M component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for transmitting, for a first wireless device, a first indication that a second wireless device associated with the first wireless device and the network device is classified as providing data of a first type. The network entity 1402 may include means for receiving, for the second wireless device and based on a second set of data elements available at the first wireless device, a re-evaluation request to re-evaluate the classification of the second wireless device. The network entity 1402 may include means for re-classifying the second wireless device based on the re-evaluation request. The network entity 1402 may include means for transmitting, based on the re-evaluation request, a third indication for the first wireless device to (1) transmit at least one of the first information or the second set of data elements to the second wireless device or (2) transmit corrected information to the second wireless device. The network entity 1402 may include means for transmitting, for the first wireless device, an additional indication that the second wireless device is re-classified as providing correct information. The network entity 1402 may include means for receiving peer information history regarding a set of wireless devices in a geographic area, wherein the peer information history is associated with the first wireless device. The network entity 1402 may include means for transmitting, to a third wireless device associated with the geographic area, second information based on the peer information history. The means may be the M/D-M component 199 of the network entity 1402 configured to perform the functions recited by the means or described in relation to any of the flowcharts of FIGS. 11 and 12. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
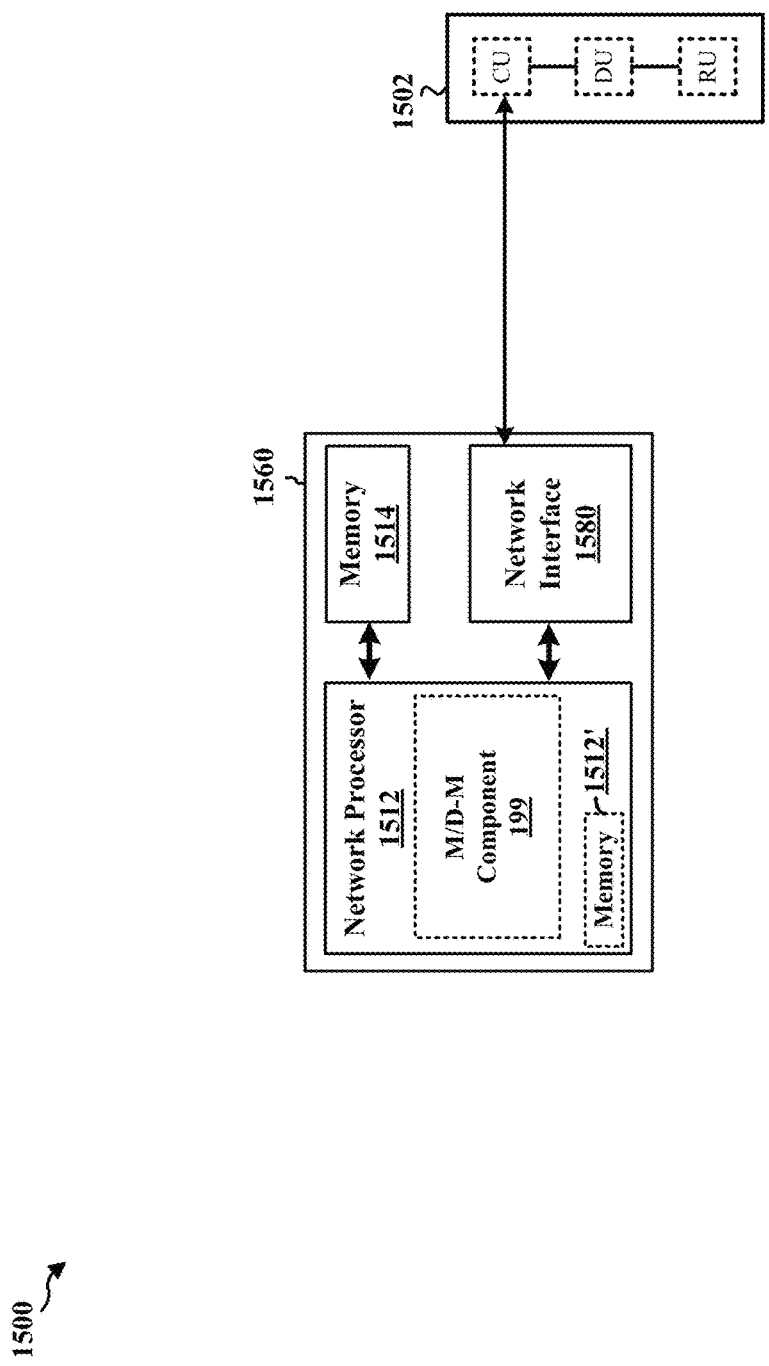
FIG. 15 is a diagram illustrating an example of a hardware implementation for a network entity.

FIG. 15 is a diagram 1500 illustrating an example of a hardware implementation for a network entity 1560. In one example, the network entity 1560 may be within the core network 120. The network entity 1560 may include a network processor 1512. The network processor 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The processor 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the M/D-M component 199 may be configured to transmit, for a first wireless device, a first indication that a second wireless device associated with the first wireless device and the network device is classified as providing data of a first type. The M/D-M component 199 may further be configured to receive, for the second wireless device and based on a second set of data elements available at the first wireless device, a re-evaluation request to re-evaluate the classification of the second wireless device. The M/D-M component 199 may be within the processor 1512. The M/D-M component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 may include means for transmitting, for a first wireless device, a first indication that a second wireless device associated with the first wireless device and the network device is classified as providing data of a first type. The network entity 1560 may include means for receiving, for the second wireless device and based on a second set of data elements available at the first wireless device, a re-evaluation request to re-evaluate the classification of the second wireless device. The network entity 1560 may include means for re-classifying the second wireless device based on the re-evaluation request. The network entity 1560 may include means for transmitting, based on the re-evaluation request, a third indication for the first wireless device to (1) transmit at least one of the first information or the second set of data elements to the second wireless device or (2) transmit corrected information to the second wireless device. The network entity 1560 may include means for transmitting, for the first wireless device, an additional indication that the second wireless device is re-classified as providing correct information. The network entity 1560 may include means for receiving peer information history regarding a set of wireless devices in a geographic area, wherein the peer information history is associated with the first wireless device. The network entity 1560 may include means for transmitting, to a third wireless device associated with the geographic area, second information based on the peer information history. The means may be the M/D-M component 199 of the network entity 1560 configured to perform the functions recited by the means or described in relation to any of the flowcharts of FIGS. 11-12.

In some aspects of wireless communication, a communication network may include perceptive wireless communication components. Perceptive wireless communication may relate to communication systems that are assisted by the perception of the physical environment/world. The perception of the physical environment/world, in some aspects, includes measurement data and machine learning feature data gathered from vehicular sensors, e.g., RADAR, LIDAR, cameras, GNSS, IMU sensors. Communications tasks that benefit from perception, in some aspects, include beam management, beam blockage prediction, beam refinement, etc.

As a non-limiting example of perception wireless communication, sensing-related measurement data and feature data gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs, in-vehicle UEs, vehicles, vehicular sensors, GPS devices, and/or other similar devices providing data for processing by (or propagating through) one or more AI/ML training/inference servers.

Rogue actors (actors whose information is misleading, incorrect, inaccurate, mistaken, misleading, corrupted, and/ or deceptive) can introduce or cause error propagation at multiple stages of a perceptive wireless communication procedure. The misleading or incorrect information (e.g., misinformation) may include one or more of raw sensing data, bounding boxes and other features extracted from onboard ML models, UE/wireless device location, UE/wireless device orientation/velocity, and/or beam measurements at the UE. Therefore, one or more rogue actors can severely degrade the benefits from coordination among multiple actors, most of which may not be rogue actors. Robustness to such rogue actors may improve the usefulness (e.g., accuracy) of the perceptive wireless communication.

For vehicle to vehicle (V2V) communication, each vehicle or vUE may maintain information regarding a set of relevant actors (e.g., an access list). The information may be based on one or more classification operations (e.g., operations to classify actors as honest, misinforming, or disinforming) at different levels of granularity and/or performed by different network components (e.g., base stations, network entities, ML service entities, etc.). A vUE, in some aspects, may determine access permissions and/or revocations based on classifications of one or more of associated sensors of the vUE, (temporary) neighboring vUEs maintaining V2V links, road side units (RSUs) associated with frequently visited locations. In some aspects, an SDC may determine access permissions/revocations among all the sensors that act as its sources of information. For example, an access list may be generated based on various stages of an ML or non-ML service/procedure (in perceptive wireless communications or otherwise), e.g., data collection, feature extraction, feature aggregation, and so on. An access list, in some aspects, may be generated independently and/or in coordination with other actors (e.g., a base station, network entity, RSUs, neighboring vUEs, etc.).

In some aspects, a set of relevant actors may include actors that have a non-negligible probability of interacting with the vUE during a preceding or a following time period (of a known or configured duration). The determination of the set of relevant actors, in some aspects, may be made by one or more of the vUE itself, a central network entity such as a base station or network service entity, a neighboring vUE (provided that the neighboring vUE is permitted by the first vUE to determine and communicate lists of relevant actors). In some aspects, a relevant actor may be trustworthy (will not have access revoked) or untrustworthy (will have access revoked) for a set of zero or more services and contexts.

For situations associated with separate transmissions of the same data to various actors, separate, although not necessarily independent, local determinations of rogue (misinforming and/or disinforming) actors may be made. For example, when a data element (e.g., image from front camera) is an input, exclusively, to a V2V application, such as sensor sharing, the rogue detection procedure for all the services relevant to that V2V application and data element may be executed entirely locally. When a data element is an input to both V2I and V2V applications, the procedures for disinforming rogue detection may, in some aspects, be made separately at the central and local levels. For instance, one or more data elements may be unaltered in the packets transmitted for V2I services, and still be altered and misleading in the corresponding packets sent to some vUEs for V2V services. For example, a disinforming vUE may be aware of a likelihood (or probability) that a destination of a data element (or set of data elements) is capable of independently confirming the information included in the data element and, based on the likelihood may determine whether to alter the data element before transmission. In some aspects, a disinforming actor may alter transmission regarding a radar point cloud associated with an object and/or vehicle when transmitting to a first vUE (or network entity) that is out of a line of sight and is unlikely to be able to independently verify the data (or lacks associated sensors that may be used to independently verify the information), but may transmit unaltered data to a second vUE that has a line of sight to the object and/or vehicle and is therefore likely to be able to independently verify the information. In some aspects, the alteration of the data elements (or packets) may be intended to cause a combination of accidents, traffic jams, or reallocation of cellular resources. By making use of classifications (or determinations) of rogue actor status at both the (centralized) network device and the (distributed) set of wireless devices, the rogue actor identification may be improved compared to the separate identifications and/or classifications.

Figure 16:
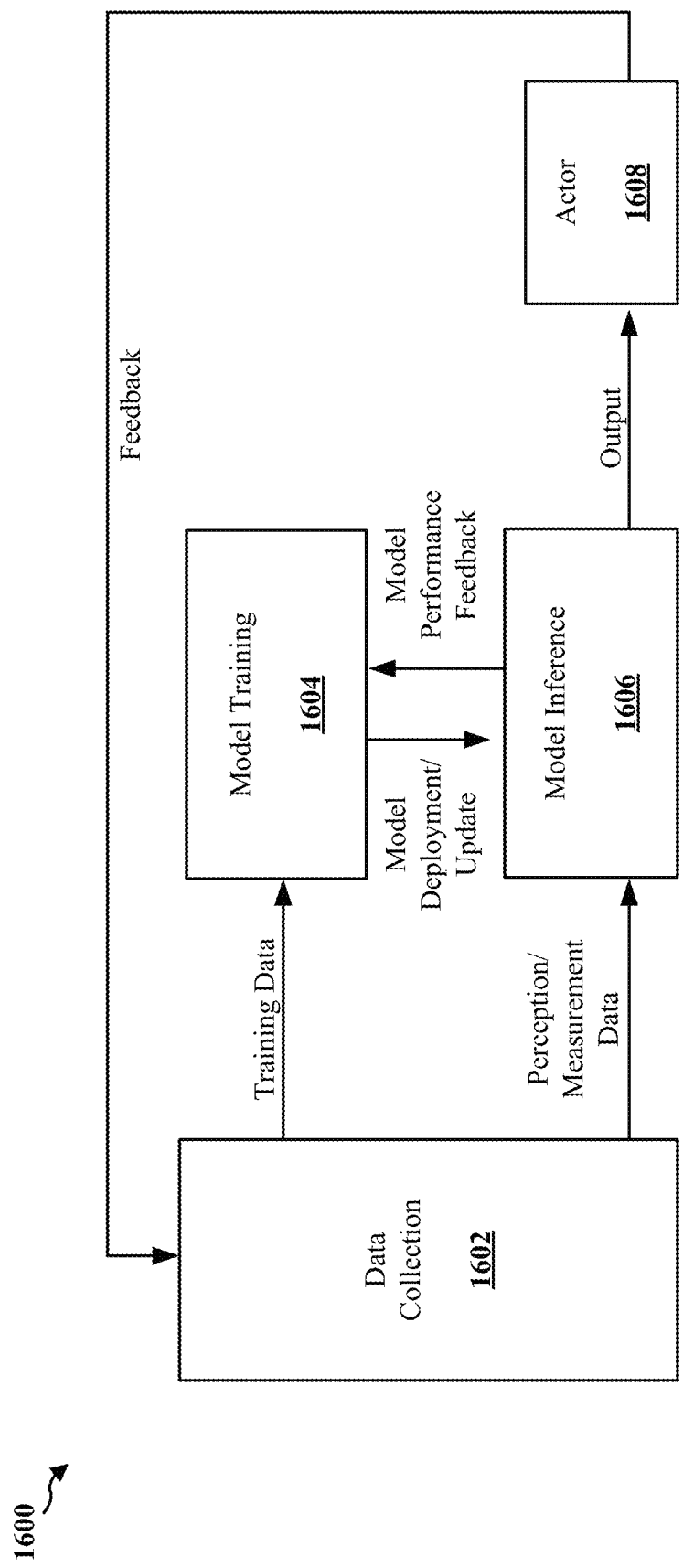
FIG. 16 is an example of the AI/ML algorithm of a method of wireless communication.

FIG. 16 is an example of the AI/ML algorithm 1600 of a method of wireless communication. The AI/ML algorithm 1600 may include various functions including a data collection 1602, a model training function 1604, a model inference function 1606, and an actor 1608.

The data collection 1602 may be a function that provides input data to the model training function 1604 and the model inference function 1606. The data collection 1602 function may include any form of data preparation, and it may not be specific to the implementation of the AI/ML algorithm (e.g., data pre-processing and cleaning, formatting, and transformation). The examples of input data may include, but not limited to, measurements, and perception information, from entities including UEs or network nodes, feedback from the actor 1608, output from another AI/ML model. The data collection 1602 may include training data, which refers to the data to be sent as the input for the AI/ML model training function 1604, and inference data, which refers to be sent as the input for the AI/ML model inference function 1606.

The model training function 1604 may be a function that performs the ML model training, validation, and testing, which may generate model performance metrics as part of the model testing procedure. The model training function 1604 may also be responsible for data preparation (e.g., data pre-processing and cleaning, formatting, and transformation) based on the training data delivered or received from the data collection 1602 function. The model training function 1604 may deploy or update a trained, validated, and tested AI/ML model to the model inference function 1606, and receive a model performance feedback from the model inference function 1606.

The model inference function 1606 may be a function that provides the AI/ML model inference output (e.g., predictions or decisions). The model inference function 1606 may also perform data preparation (e.g., data pre-processing and cleaning, formatting, and transformation) based on the inference data delivered from the data collection 1602 function. The output of the model inference function 1606 may include the inference output of the AI/ML model produced by the model inference function 1606. The details of the inference output may be use-case specific. As an example, the output may include an identification of actors provide disinformation or misinformation, such as described in connection with any of FIGS. 5-13.

The model performance feedback may refer to information derived from the model inference function 1606 that may be suitable for improvement of the AI/ML model trained in the model training function 1604. The feedback from the actor 1608 or other network entities (via the data collection 1602 function) may be implemented for the model inference function 1606 to create the model performance feedback.

The actor 1608 may be a function that receives the output from the model inference function 1606 and triggers or performs corresponding actions. The actor may trigger actions directed to network entities including the other network entities or itself. The actor 1608 may also provide a feedback information that the model training function 1604 or the model inference function 1606 to derive training or inference data or performance feedback. The feedback may be transmitted back to the data collection 1602.

The network may use machine-learning algorithms, deep-learning algorithms, neural networks, reinforcement learning, regression, boosting, or advanced signal processing methods for aspects of wireless communication including the identification of actors providing disinformation or misinformation.

In some aspects described herein, the network may train one or more neural networks to learn dependence of measured qualities on individual parameters. Among others, examples of machine learning models or neural networks that may be comprised in the network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution AxB operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, including receiving a first indication that a second wireless device associated with the first wireless device and a network device is classified as providing data of a first type; receiving a first set of data elements from the second wireless device; identifying, based on the first set of data elements received from the second wireless device and a second set of data elements available at the first wireless device, that the classification of the second wireless device may be inaccurate; and transmitting, based on the identification that the classification of the second wireless device may be inaccurate, at least one of a second indication for the second wireless device to transmit a re-evaluation request or a third indication to the second wireless device to terminate a communication session with the first wireless device.

Aspect 2 is the method of aspect 1, where the first indication is received from the network device and the second wireless device is classified as providing data of the first type by one of the network device or a service entity associated with the network device.

Aspect 3 is the method of any of aspects 1 and 2, where the second set of data elements includes at least one of internal information collected by one or more sensors of the first wireless device or external information provided by one or more additional wireless devices.

Aspect 4 is the method of aspect 3, further including receiving the first set of data elements from the second wireless device as part of a vehicle-to-vehicle communication between the first wireless device and the second wireless device associated with one or more of sensor sharing, BSM, or maneuvering messages.

Aspect 5 is the method of any of aspects 1 to 4, where the data of the first type includes incorrect information and the second set of data elements includes first information that may be used to correct the incorrect information provided by the second wireless device, the method further including receiving, based on the re-evaluation request, a fourth indication to transmit at least one of the first information or the second set of data elements to the second wireless device and receiving a sixth indication that the second wireless device is re-classified as providing data of a second type including correct information.

Aspect 6 is the method of any of aspects 1 to 4, where the data of the first type includes incorrect information and the second set of data elements includes first information that may be used to correct the incorrect information provided by the second wireless device, the method further including receiving, based on the re-evaluation request, a fifth indication to (1) transmit corrected information to the second wireless device, where the corrected information is based on the second set of data elements and receiving a sixth indication that the second wireless device is re-classified as providing data of a second type including correct information.

Aspect 7 is the method of aspects 1 to 4, where the data of the first type includes correct information and the second set of data elements is inconsistent with the first set of data elements, and where transmitting the third indication is based on the second set of data elements being inconsistent with the first set of data elements.

Aspect 8, is the method of any of aspects 1 to 7, where the first indication is included in an indication of a data type classification provided by each of a plurality of devices in a geographic area associated with the network device and the first wireless device.

Aspect 9 is the method of any of aspects 1 to 8, further including maintaining independent peer history information regarding a set of wireless devices in a geographic area currently associated with the network device and the first wireless device; and transmitting additional information based on the independent peer history information to the network device.

Aspect 10 is the method of aspect 9, where the independent peer history information includes one or more of raw data, ML-based feature extraction, non-ML-based compressed information based on one or more of historical location information, local peer classification information, device identifier, packet history, timestamps, and received data elements associated with the set of wireless devices in the area currently associated with the network device and the first wireless device.

Aspect 11 is a method of wireless communication at a network device, including transmitting, for a first wireless device, a first indication that a second wireless device associated with the first wireless device and the network device is classified as providing data of a first type; and receiving, for the second wireless device and based on a second set of data elements available at the first wireless device, a re-evaluation request to re-evaluate the classification of the second wireless device.

Aspect 12 is the method of aspect 11, where the second wireless device is classified as providing data of the first type by one of the network device or a service entity associated with the network device and the re-evaluation request is received from the second wireless device.

Aspect 13 is the method of any of aspects 11 and 12, where the data of the first type includes incorrect information and the second set of data elements includes first information that may be used to correct the incorrect information provided by the second wireless device, the method further including re-classifying the second wireless device based on the re-evaluation request; transmitting, based on the re-evaluation request, a third indication for the first wireless device to (1) transmit at least one of the first information or the second set of data elements to the second wireless device or (2) transmit corrected information to the second wireless device; and transmitting, for the first wireless device, an additional indication that the second wireless device is re-classified as providing correct information.

Aspect 14 is the method of any of aspects 11 to 13, where the first indication is included in a second indication of a data type classification provided by each of a plurality of devices in a geographic area associated with the network device and the first wireless device.

Aspect 15 is the method of any of aspects 11 to 14, further including receiving peer information history regarding a set of wireless devices in a geographic area, where the peer information history is associated with the first wireless device; and transmitting, for a third wireless device associated with the geographic area, second information based on the peer information history.

Aspect 16 is the method of aspect 15, where the peer information history includes one or more of raw data, machine-learning-based (ML-based) feature extraction, non-ML-based compressed information based on one or more of historical location information, local peer classification information, device identifier, packet history, timestamps, and received data elements associated with the set of wireless devices in the geographic area, where the geographic area includes a particular geographic area currently associated with the network device and the first wireless device.

Aspect 17, is the method of any of aspects 1 to 10, where the second indication for the second wireless device to transmit the re-evaluation request further includes an indication for the second wireless device to transmit the re-evaluation request to one of the network device or the service entity that classified the second wireless device as providing data of the first type.

Aspect 18 is an apparatus for wireless communication at a device including a memory and at least one processor coupled to the memory and, based at least in part on information stored in the memory, the at least one processor is configured to implement any of aspects 1 to 17.

Aspect 19 is the method of aspect 18, further including a transceiver or an antenna coupled to the at least one processor.

Aspect 20 is an apparatus for wireless communication at a device including means for implementing any of aspects 1 to 17.

Aspect 21 is a computer-readable medium (e.g., a non-transitory computer-readable medium) storing computer executable code, where the code when executed by a processor causes the processor to implement any of aspects 1 to 17.

What is claimed is:

1. An apparatus for wireless communication at a first wireless device, comprising:
   memory; and
   one or more processors coupled to the memory and configured to cause the first wireless device to:
   receive a first classification of a second wireless device associated with the first wireless device and a network device, wherein the first classification of the second wireless device indicates an association with data provision of a first type;
   receive a first set of data elements from the second wireless device as part of a vehicle-to-vehicle communication between the first wireless device and the second wireless device;
   identify, based on the first set of data elements received from the second wireless device and a second set of data elements available at the first wireless device, that the first classification of the second wireless device may be inaccurate; and
   transmit, based on an identification that the first classification of the second wireless device may be inaccurate, at least one of a second indication for the second wireless device to transmit a re-evaluation request or a third indication to the second wireless device to terminate a communication session with the first wireless device.

2. The apparatus of claim 1, wherein to receive the first classification, the one or more processors are configured to cause the first wireless device to receive the first classification from the network device.

3. The apparatus of claim 1, wherein the second set of data elements comprises at least one of internal information collected by one or more sensors of the first wireless device or external information provided by one or more additional wireless devices.

4. The apparatus of claim 3, wherein the vehicle-to-vehicle communication between the first wireless device and the second wireless device is associated with one or more of sensor sharing, basic safety messages (BSM), or maneuvering messages.

5. The apparatus of claim 4, wherein the data provision of the first type comprises incorrect information and the second set of data elements comprises first information that may be used to correct the incorrect information provided by the second wireless device, wherein the one or more processors are further configured to cause the first wireless device to:
   receive, based on the re-evaluation request, a fourth indication to transmit at least one of the first information or the second set of data elements to the second wireless device; or
   receive, based on the re-evaluation request, a fifth indication to transmit corrected information to the second wireless device, wherein the corrected information is based on the second set of data elements; and
   receive a second classification of the second wireless device, wherein the second classification indicates that the second wireless device provides data of a second type comprising correct information.

6. The apparatus of claim 4, wherein the data provision of the first type comprises correct information and the second set of data elements is inconsistent with the first set of data elements, and wherein to transmit the third indication, the one or more processors are configured to cause the first wireless device to transmit the third indication based on the second set of data elements that is inconsistent with the first set of data elements.

7. The apparatus of claim 1, wherein to receive the first classification, the one or more processors are configured to cause the first wireless device to receive a plurality of classifications that indicate a data type provided by each wireless device of a corresponding plurality of wireless devices, wherein the plurality of classifications includes the first classification, and wherein the corresponding plurality of wireless devices comprises a plurality of wireless devices in a geographic area associated with the network device and the first wireless device.

8. The apparatus of claim 1, comprising at least one transceiver coupled to the one or more processors, the one or more processors further configured to cause the first wireless device to:
   maintain independent peer history information regarding a set of wireless devices in a geographic area currently associated with the network device and the first wireless device; and
   transmit, via the at least one transceiver, additional information based on the independent peer history information to the network device, wherein the independent peer history information comprises one or more of raw data, machine-learning-based (ML-based) feature extraction, non-ML-based compressed information based on one or more of historical location information, local peer classification information, device identifier, packet history, timestamps, or received data elements associated with the set of wireless devices in the geographic area currently associated with the network device and the first wireless device.

9. The apparatus of claim 1, wherein the second indication for the second wireless device to transmit the re-evaluation request further comprises an indication for the second wireless device to transmit the re-evaluation request to one of the network device or a service entity, wherein at least one of the network device or the service entity performed the first classification.

10. An apparatus for wireless communication at a network device, comprising:
    memory; and
    one or more processors coupled to the memory and configured to cause the network device to:
    transmit, for a first wireless device, a first classification of a second wireless device associated with the first wireless device and the network device, wherein the first classification of the second wireless device indicates an association with data provision of a first type as part of vehicle-to-vehicle communications associated with the second wireless device, and the first classification is based on at least a first set of data elements associated with the second wireless device; and
    receive, from the second wireless device and based on a second set of data elements available at the first wireless device, a re-evaluation request to re-evaluate the first classification of the second wireless device.

11. The apparatus of claim 10, wherein to receive the re-evaluation request, the one or more processors are configured to cause the network device to receive the re-evaluation request from the second wireless device, the one or more processors further configured to cause the network device to one or more of:
perform the first classification of the second wireless device; or
receive the first classification from a service entity associated with the network device.

12. The apparatus of claim 10, wherein the data provision of the first type comprises incorrect information and the second set of data elements comprises first information that may be used to correct the incorrect information provided by the second wireless device, the one or more processors further configured to cause the network device to:
re-classify the second wireless device based on the re-evaluation request;
transmit, based on the re-evaluation request, a third indication for the first wireless device to (1) transmit at least one of the first information or the second set of data elements to the second wireless device or (2) transmit corrected information to the second wireless device; and
transmit, for the first wireless device, a second classification of the second wireless device, wherein the second classification indicates that the second wireless device provides correct information.

13. The apparatus of claim 10, wherein to transmit the first classification, the one or more processors are configured to cause the network device to transmit a plurality of classifications that indicate a data type provided by each wireless device of a corresponding plurality of wireless devices, wherein the plurality of classifications includes the first classification, and wherein the corresponding plurality of wireless devices comprises a plurality of wireless devices in a geographic area associated with the network device and the first wireless device.

14. The apparatus of claim 10, further comprising at least one transceiver coupled to the one or more processors, the one or more processors further configured to cause the network device to:
receive, via the at least one transceiver, peer information history regarding a set of wireless devices in a geographic area, wherein the peer information history is associated with the first wireless device; and
transmit, via the at least one transceiver, for a third wireless device associated with the geographic area, second information based on the peer information history.

15. The apparatus of claim 14, wherein the peer information history comprises one or more of raw data, machine-learning-based (ML-based) feature extraction, non-ML-based compressed information based on one or more of historical location information, local peer classification information, device identifier, packet history, timestamps, or received data elements associated with the set of wireless devices in the geographic area, wherein the geographic area comprises a particular geographic area currently associated with the network device and the first wireless device.

16. A method of wireless communication at a first wireless device, comprising:
receiving a first classification of a second wireless device associated with the first wireless device and a network device, wherein the first classification of the second wireless device indicates an association with data provision of a first type;
receiving a first set of data elements from the second wireless device as part of a vehicle-to-vehicle communication between the first wireless device and the second wireless device;
identifying, based on the first set of data elements received from the second wireless device and a second set of data elements available at the first wireless device, that the first classification of the second wireless device may be inaccurate; and
transmitting, based on an identification that the first classification of the second wireless device may be inaccurate, at least one of a second indication for the second wireless device to transmit a re-evaluation request or a third indication to the second wireless device to terminate a communication session with the first wireless device.

17. The method of claim 16, wherein the first classification is received from the network device and the second wireless device is classified by one of the network device or a service entity associated with the network device.

18. The method of claim 16, wherein the second set of data elements comprises at least one of internal information collected by one or more sensors of the first wireless device or external information provided by one or more additional wireless devices.

19. The method of claim 18, wherein
the vehicle-to-vehicle communication between the first wireless device and the second wireless device is associated with one or more of sensor sharing, basic safety messages (BSM), or maneuvering messages.

20. The method of claim 16, wherein the data provision of the first type comprises incorrect information and the second set of data elements comprises first information that may be used to correct the incorrect information provided by the second wireless device, the method further comprising at least one of:
receiving, based on the re-evaluation request, a fourth indication to transmit at least one of the first information or the second set of data elements to the second wireless device; or
receiving, based on the re-evaluation request, a fifth indication to (1) transmit corrected information to the second wireless device, wherein the corrected information is based on the second set of data elements; and
receiving a second classification of the second wireless device, wherein the second classification indicates that the second wireless device provides data of a second type comprising correct information.

21. The method of claim 19, wherein the data provision of the first type comprises correct information and the second set of data elements is inconsistent with the first set of data elements, and wherein transmitting the third indication is based on the second set of data elements being inconsistent with the first set of data elements.

22. The method of claim 16, wherein the first classification is included in a plurality of classifications that indicates a data type provided by each wireless device of a corresponding plurality of wireless devices in a geographic area associated with the network device and the first wireless device.

23. The method of claim 16, further comprising:
maintaining independent peer history information regarding a set of wireless devices in a geographic area currently associated with the network device and the first wireless device; and
transmitting additional information based on the independent peer history information to the network device, wherein the independent peer history information comprises one or more of raw data, machine-learning-based (ML-based) feature extraction, non-ML-based compressed information based on one or more of historical location information, local peer classification information, device identifier, packet history, timestamps, or received data elements associated with the set of wireless devices in the geographic area currently associated with the network device and the first wireless device.

24. The method of claim 17, wherein the second indication for the second wireless device to transmit the re-evaluation request further comprises an indication for the second wireless device to transmit the re-evaluation request to one of the network device or the service entity.

25. A method of wireless communication at a network device, comprising:
    transmitting, for a first wireless device, a first classification of a second wireless device associated with the first wireless device and the network device, wherein the first classification of the second wireless device indicates an association with data provision of a first type as part of vehicle-to-vehicle communications associated with the second wireless device, and the first classification is based on at least a first set of data elements associated with the second wireless device; and
    receiving, from for the second wireless device and based on a second set of data elements available at the first wireless device, a re-evaluation request to re-evaluate the first classification of the second wireless device.

26. The method of claim 25, wherein the re-evaluation request is received from the second wireless device, the method further comprising one or more of:
    performing the first classification of the second wireless device; or
    receiving the first classification from a service entity associated with the network device.

27. The method of claim 25, wherein the data provision of the first type comprises incorrect information and the second set of data elements comprises first information that may be used to correct the incorrect information provided by the second wireless device, the method further comprising:
    re-classifying the second wireless device based on the re-evaluation request;
    transmitting, based on the re-evaluation request, a third indication for the first wireless device to (1) transmit at least one of the first information or the second set of data elements to the second wireless device or (2) transmit corrected information to the second wireless device; and
    transmitting, for the first wireless device, a second classification of the second wireless device, wherein the second classification indicates that the second wireless device provides correct information.

28. The method of claim 25, wherein the first classification is included in a plurality of classifications that indicates a data type provided by each wireless device of a corresponding plurality of wireless devices in a geographic area associated with the network device and the first wireless device.

29. The method of claim 25, further comprising:
    receiving peer information history regarding a set of wireless devices in a geographic area, wherein the peer information history is associated with the first wireless device; and
    transmitting, to a third wireless device associated with the geographic area, second information based on the peer information history.

30. The method of claim 29, wherein the peer information history comprises one or more of raw data, machine-learning-based (ML-based) feature extraction, non-ML-based compressed information based on one or more of historical location information, local peer classification information, device identifier, packet history, timestamps, or received data elements associated with the set of wireless devices in the geographic area, wherein the geographic area comprises a particular geographic area currently associated with the network device and the first wireless device.

\* \* \* \* \*